United States Patent [19]
Suzuki et al.

[11] Patent Number: 5,379,621
[45] Date of Patent: Jan. 10, 1995

[54] APPARATUS FOR GENERATING AN UNDERLIQUID SHOCK PRESSURE

[75] Inventors: Minoru Suzuki; Katsumi Ikusawa; Kenji Araki; Naotake Yoshihara; Yoshio Murayama, all of Kawasaki, Japan

[73] Assignee: NKK Corporation, Tokyo, Japan

[21] Appl. No.: 223,424

[22] Filed: Apr. 5, 1994

Related U.S. Application Data

[62] Division of Ser. No. 63,160, May 18, 1993, which is a division of Ser. No. 886,717, May 21, 1992, Pat. No. 5,256,430.

[30] Foreign Application Priority Data

| May 29, 1991 | [JP] | Japan | 3-152278 |
| Jun. 17, 1991 | [JP] | Japan | 3-170326 |
| Jun. 17, 1991 | [JP] | Japan | 3-170327 |
| Jun. 17, 1991 | [JP] | Japan | 3-170328 |
| Aug. 30, 1991 | [JP] | Japan | 3-244081 |
| Aug. 30, 1991 | [JP] | Japan | 3-244082 |
| Aug. 30, 1991 | [JP] | Japan | 3-244083 |
| Oct. 25, 1991 | [JP] | Japan | 3-305651 |

[51] Int. Cl.$^6$ ............................................. B21D 26/08
[52] U.S. Cl. .................................... 72/56; 29/421.2
[58] Field of Search .................... 72/54, 56, 63, 55; 29/421.2

[56] References Cited

U.S. PATENT DOCUMENTS

| 3,188,844 | 6/1965 | Schwinghamer . |
| 3,195,334 | 7/1965 | Filler . |
| 3,492,688 | 2/1970 | Godfrey . |
| 3,566,646 | 3/1971 | Walkup . |
| 3,742,746 | 7/1973 | Erlandson . |
| 4,027,515 | 6/1977 | Chachin et al. . |

FOREIGN PATENT DOCUMENTS

| 739722 | 8/1966 | Canada . |
| 3614098A1 | 10/1987 | Germany . |
| 1-157725 | 6/1989 | Japan . |

*Primary Examiner*—David Jones
*Attorney, Agent, or Firm*—Frishauf, Holtz, Goodman & Woodward

[57] ABSTRACT

A method for generating an underliquid shock pressure comprises the steps of igniting a combustible mixture gas to form detonation waves, imploding the detonation waves in their advancing direction, propagating a pressure obtained by imploding the detonation waves to a liquid, and converting the pressure to an underliquid pressure which is applied to a workpiece. The pressure obtained by imploding the detonation waves may be applied directly to an elastic rubber body, thus converting the pressure to an underelastomer shock pressure, which is then applied to the workpiece via the elastic body. An apparatus for generating an underliquid shock pressure comprises a combustion chamber whose cross-sectional area decreases from one end toward the other end of the chamber, an ignition chamber to which fuel is fed and in which a spark plug is positioned, a plurality of guidance paths extending from the ignition chamber and communicating with one end of the combustion chamber, each of the guidance paths having substantially the same length, and a pressure medium chamber connected to an opening of the other end of the combusiton chamber having the smallest cross-sectional area. The pressure at the smallest cross-sectional area end of the combustion chamber is applied to a liquid to convert the pressure into underliquid shock pressure, which is then applied to a workpiece either directly or via an elastic body interposed between the liquid and the workpiece.

9 Claims, 19 Drawing Sheets

APPARATUS FOR GENERATING AN UNDERLIQUID SHOCK PRESSURE

This is a division of application Ser. No. 08/063,160, filed May 18, 1993, which is a division of Ser. No. 07/886,717 filed May 21, 1992, now U.S. Pat. No. 5,256,430.

BACKGROUND OF THE INVENTION

1. Field of the Invention

The present invention relates to a method for generating a detonation pressure wherein a high shock pressure appropriate for pressure joining and pressure forming of materials can be easily obtained and an apparatus therefor.

2. Description of the Related Art

Methods for joining or forming plates and for processing food under pressure by generating a high shock pressure have been proposed.

A known apparatus for joining materials under a shock pressure is described as follows:

In the known apparatus, a base material is placed on a holding means such as a surface plate or the like, and a material to be joined to the base material under pressure is held in parallel or at some angle relative to the base material, explosives and cushioning materials are disposed on the entire surface of the material to be joined, and the explosives on the material are exploded from an end of the explosives to the other end thereof. Each of the parts of the material to be joined one after another strike the base material from an end of the material to the other end thereof as the explosion goes. When the material to be joined strikes the base material during the explosion, oxide films are blown away. The material to be joined is deposited on the base material by heat generated by plastic deformation of the material to be joined and the base material. At the same time, the material to be joined is pressed and joined to the base material by a shock pressure of the explosion.

In this known apparatus, however, there are problems such as ① use of dangerous and expensive explosives, ② limitation of places where the apparatus can be used due to danger where the explosives are placed, ③ difficulties in control of pressures applied to materials and ④ no applicability of the apparatus to a short-time repeated joining of materials.

The following apparatuses are known for forming a plate under an underwater shock pressure.

Japanese Patent Application Laid Open No. 157725/89 discloses an underwater shock pressure generating apparatus wherein an impact hydraulic pressure is generated in liquid by shooting a bullet into the liquid such as pressure water, applying the pressure to a material and pressing the material to a die, thereby carrying out a three-dimensional forming of the material.

Further, an explosion forming apparatus is known wherein a three-dimensional forming of a thin plate is carried out by generating an underwater shock pressure by combusting explosives under water and utilizing the underwater shock pressure. This apparatus is used mainly for forming of large size parts.

Furthermore, an apparatus is known wherein an underwater shock pressure is generated by causing a piston accelerated by a gas pressure to a high speed to strike the surface of a pressure liquid contained in a vessel and a member to be formed is pressed to a die by the underwater shock pressure. This apparatus is used for forming comparatively small size parts.

In the above-mentioned apparatuses, however, there are problems such as ① use of dangerous and expensive explosives, ② limitation of places where the apparatus can be used due to danger where the explosives are placed, ③ difficulties in control of pressures applied to materials and ④ no applicability of the apparatus to a short-time repeated joining of materials.

It is also known that application of a high pressure to foods is effective in keeping the foods in a good state during processing of the foods. For example, meat after slaughter becomes rigid if it is left as it is. This is because muscle fibrils become stiff. To prevent muscle fibrils from stiffening, a method for softening meat by breaking the muscle fibrils by applying a static superhigh pressure to the muscle fibrils for 5 to 10 minutes on the occasion of freezing meat for preservation is adopted. Beverages or food containing a great amount of liquid are sterilized by applying a superhigh pressure to the beverage or the food. A cold isostatic pressing method is typical of methods for obtaining the above static superhigh pressure.

Applying a static superhigh pressure to food for a long time causes a taste of the food to change, which is undesirable Moreover, it is pointed out that a high cost is required for applying a static superhigh pressure to food, and it is difficult to treat a large amount of food for a short time.

SUMMARY OF THE INVENTION

It is an object of the present invention to provide a method for generating a detonation pressure wherein a high shock pressure appropriate for a pressure joining and a pressure forming of materials can be easily obtained and an apparatus therefor.

A method for generating an underwater shock pressure comprises the steps of:
 igniting a combustible mixture gas to form detonation waves;
 imploding said detonation waves in their advancing direction; and
 propagating a pressure obtained by imploding said detonation waves to a liquid and thereby converting the propagated pressure to an underliquid shock pressure.

Throughout the text, the word of "underliquid" is a word replaced by "liquid" for "water" in the word of "underwater".

A method for generating an underelastomer shock pressure comprises the above igniting and imploding steps, and therefor, propagating a pressure obtained by imploding said detonation waves to an elastic body and thereby converting the propagated pressure to an underelastomer shock pressure.

Throughout the text, the word of "underelastomer" is a word replaced by "underelastomer" for "water" in the word of "underwater".

In the above method for generating an underwater shock pressure, the propagated pressure obtained by imploding said detonation waves may be applied to the elastic body via a replaceable pressure medium.

An apparatus for generating an underliquid shock pressure comprises:
 a combustion chamber whose cross-sectional area decreases from one end of the chamber toward another end of the chamber;

an ignition chamber, to which fuel is fed and in which a spark producing means, such as a spark plug, is positioned;

a plurality of guidance paths extending from said ignition chamber and communicating with said one end of said combustion chamber, each of the guidance paths having substantially the same length; and a pressure medium chamber connected to an opening at said another end of said combustion chamber having the smallest cross-sectional area.

An apparatus for generating an underelastomer shock by means of detonation comprises the above-mentioned combustion chamber, ignition chamber and guidance paths, and wherein the pressure medium chamber is replaced by a pressure elastic body-medium chamber which is connected to said opening of said another end of said combustion chamber and which contains an elastic body.

DETAILED DESCRIPTION

Example 1

An example of the apparatus for generating a LISPID will now be described below.

Figure 1:
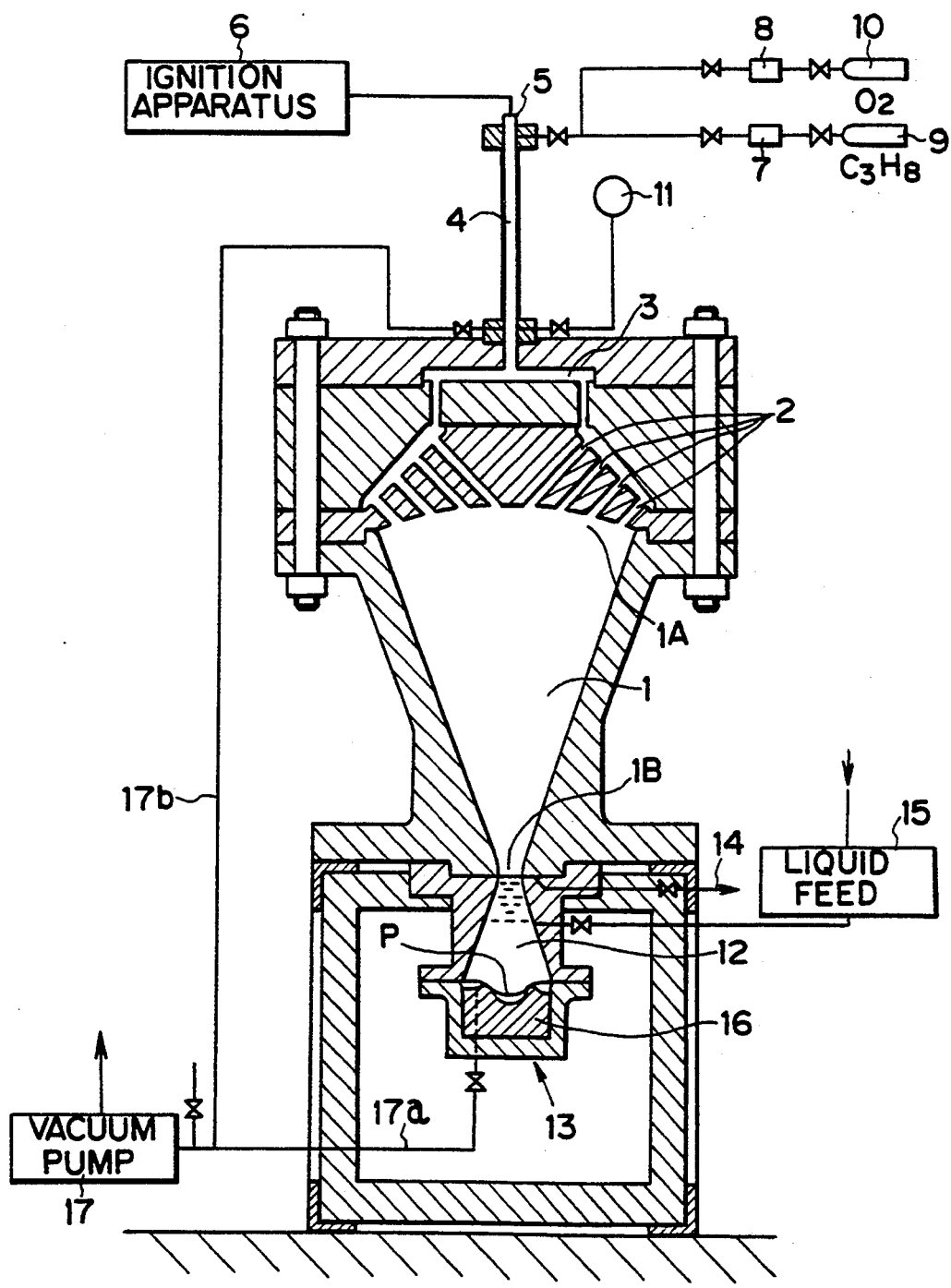
FIG. 1 is a vertical sectional view showing an apparatus of the present invention for generating an underwater shock pressure by means of detonation.

In FIG. 1, reference numeral 1 denotes a combustion chamber. The cross-sectional area of the combustion chamber 1 is largest at the upper end 1A thereof and smallest at the lower end 1B thereof. Therefore, the inside of the combustion chamber forms a conical imploding portion. An upper inner wall of the upper end 1A of the combustion chamber 1 is gradually curved upwardly. A plurality of hole-shaped guidance paths 2 communicate with the inner wall of the upper end 1A. The guidance paths 2 are connected to a distribution chamber 3 having a disc-shaped space. The length of each of the guidance paths 2 is made substantially equal to each other. An ignition chamber 4 extending upwardly communicates with the distribution chamber 3. A spark plug 5 operatively connected to an ignition apparatus 6 is positioned at the upper portion of the ignition chamber 4. A fuel feed source 9 is connected to the upper portion of the ignition chamber 4 via a flowmeter 7. An oxidizer feed source 10 is connected to the upper portion of the ignition chamber 4 via a flowmeter 8. A pressure gauge 11 is provided for confirming a pressure inside the ignition chamber 4.

Figure 1A:
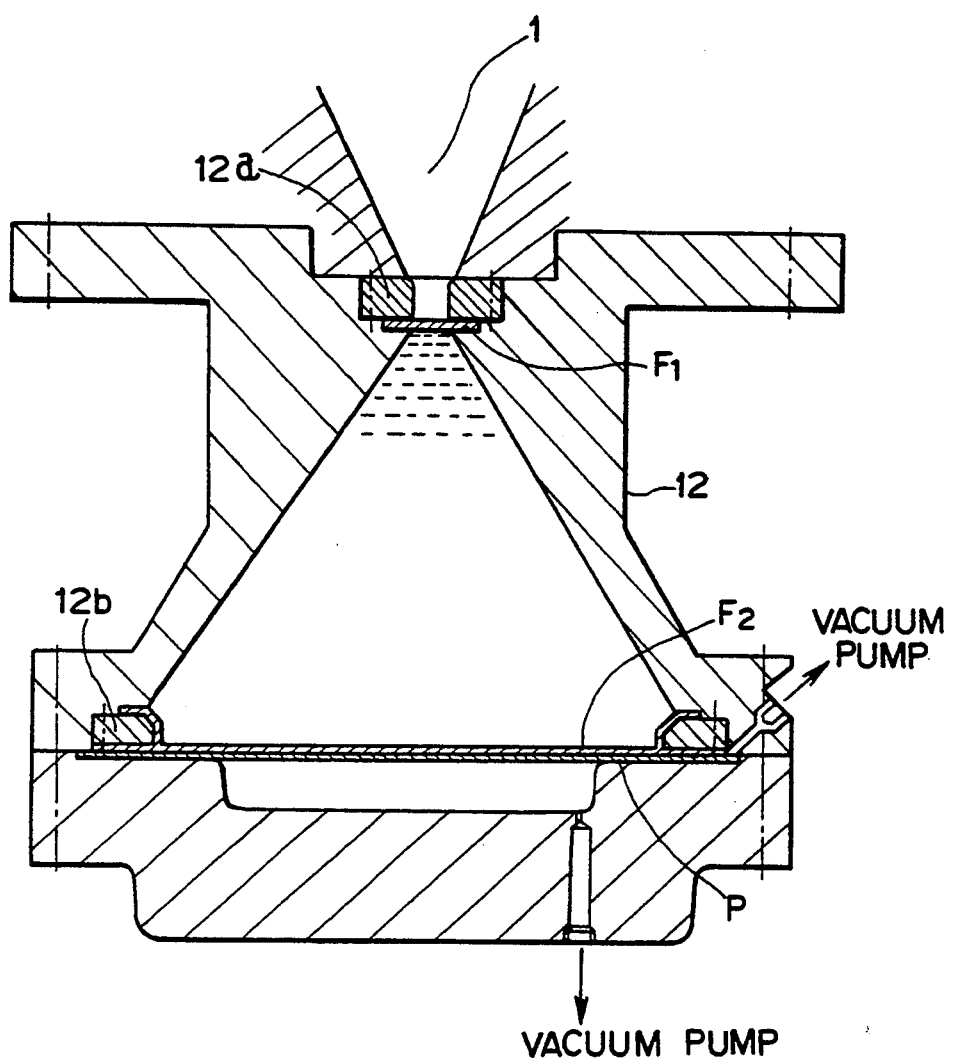
FIG. 1A shows a state that a film is attached to a pressure medium chamber.

The lower end 1B of the combustion chamber 1 has an opening. A pressure medium chamber 12 is connected to the lower end 1B of the combustion chamber 1. A forming chamber housing 13 as an example of the use of underliquid shock pressure is positioned just under the pressure medium chamber 12. Liquid such as water as a pressure medium is contained in the pressure medium chamber 12. An interface between a liquid surface and the lower end 1B of the combustion chamber 1 can be provided on the upper liquid surface of the liquid in chamber 12. A strong film F easy to be deformed can be provided on the upper liquid surface of the liquid in chamber 12. When a film $F_1$ is attached to the upper end of the pressure medium chamber 12 by means of a mounting plate 12a having a hole of the same size as that of the opening at the lower end 1B of the combustion chamber 1 as shown in FIG. 1A, the liquid is prevented from evaporating. A film $F_2$ is attached to the lower end of the pressure medium chamber 12 by means of a mounting plate 12b having a hole of the same size as that of the opening at the lower end of the pressure medium chamber 12 to hold the liquid, with which the pressure medium chamber is filled. A space between the film $F_2$ and a plate P is evacuated by a vacuum pump 17. If an air layer is formed in the space, the underliquid shock pressure cannot be effectively communicated to the plate P. Natural rubber or synthetic rubber is used for the films $F_1$ and $F_2$.

The thicknesses of the films $F_1$ and $F_2$ are determined depending on the sizes of processed products. When the size of a processed product is 1 m or less, for example, the thickness of the product is from 5 to 10 mm. When the size of the product is from 1 to 2 m, the thickness of the product is from 10 to 20 mm.

An air vent pipe 14 is connected to the pressure medium chamber 12 via a valve. An apparatus 15 for feeding liquid such as water is connected to the pressure medium chamber 12 via a valve.

A die 16 whose upper face has a three-dimensional form for forming and which is replaceable is contained in the forming chamber housing 13. If necessary, a plate P to be formed is held between a flange of the forming chamber housing 13 and a flange of the pressure medium chamber 12, the peripheral portion of the plate P being held between the flanges as shown in FIG. 1. A vacuum pump apparatus 17 for evacuating a space between the die 16 and the plate P, Which penetrates the die 16 and passes through the space, is connected to the forming chamber housing 13 by means of pipes 17a. The vacuum pump apparatus 17 is also connected to the aforementioned ignition chamber 4 by means of pipes 17b.

A generation of a high underliquid shock pressure by means of the aforementioned apparatus for generating a LISPID and a method for forming a plate by utilizing a high hydraulic underliquid shock pressure will now be described below.

① Initially, a plate P to be formed is placed on a die 16.

② Subsequently, the ignition chamber 4, the distribution chamber 3, the guidance paths 2 and the combustion chamber 1 are evacuated by the vacuum pump apparatus 17 via pipe 17b. At the same time, the space between the die 16 and the plate P is evacuated via pipe 17a. The space between the Film $F_2$ and the plate is evacuated.

③ Thereafter, the pressure medium chamber 12 is filled with water via liquid feed 15. The ignition chamber 4, the distribution chamber 3, the guidance paths 2 and the combustion chamber 1 are filled with combustible gas of a substantially stoichiometric mixture ratio from the fuel feed source 9 and the oxidizer feed source 10. Gaseous fuel such as methane gas, ethane gas, propane gas or hydrogen gas is used for combustible gas.

④ Then, the spark plug 5 is caused to create a spark by the ignition apparatus 6. Detonation is generated in the ignition chamber 4 by such an ignition. A flame is propagated to the upper end 1A of the combustion chamber 1 through the distribution chamber 3 and the guidance paths 2. Since the plurality of guidance paths 2 have the same length, the flame passing through each of the plurality of guidance paths substantially simultaneously reaches the upper end 1A of the combustion chamber 2.

⑤ A pressure wave produced by the flame advances from the upper end 1A to the lower end 1B in the combustion chamber 1. Since the cross-sectional area of the combustion chamber 1 gradually decreases downwardly, a pressure of the pressure wave is increased in the downward direction and becomes extremely high at the lower end 1B of the combustion chamber 1.

⑥ This high pressure is propagated from the upper liquid surface at the opening of the lower end 1B of the combustion chamber 1 into the liquid in chamber 12, and the plate P strikes violently against the die 16, thereby forming the plate P to the shape of the upper surface of the die 16.

⑦ Thereafter, the plate as a formed product is taken out. Forming of plates can be successively carried out by repeating the aforementioned steps ① to ⑥.

Figure 2:
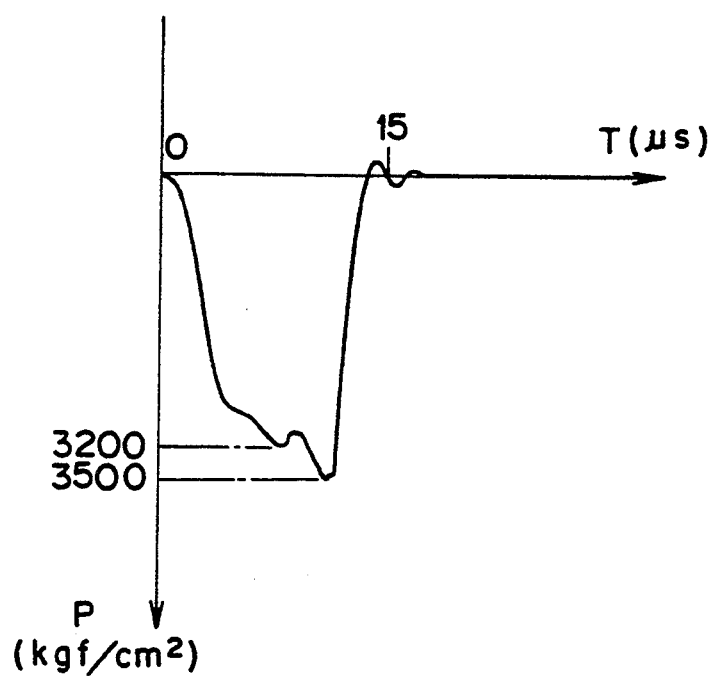
FIG. 2 is a graphical representation showing an example of an underliquid shock wave produced by the apparatus for generating an underliquid shock pressure by means of detonation according to the present invention.

FIG. 2 is a graphical representation showing the result of measurement of a pressure adjacent to the upper liquid surface facing the lower end 1B of the combustion chamber 1 When a gas pressure at the center of the combustion chamber 1 was determined to be 370,000 atm, a shock pressure was generated for 15 $\mu$sec and a primary wave and a secondary wave were obtained. The pressure of the primary wave was 3200 kgf/cm$^2$ and the pressure of the secondary wave was 3500 kgf/cm$^2$. Those pressures can be easily adjusted by controlling the gas pressure, the amount of gas or the mixing ratio of gas, with which the combustion chamber is filled up.

According to the present invention, the following effect can be obtained.

① An underliquid shock pressure having good characteristics and a steep or fast start can be easily obtained at a low cost.

② Since the level of the underliquid shock pressure in the apparatus of the present invention depends on the pressure of the initial charging gas in the detonation apparatus, the apparatus of the present invention provides good controllability by varying the gas charging pressure.

③ Since explosives are not used, contrary to conventional apparatuses wherein bullets are shot and explosives are exploded, places where the apparatus of the present invention can be installed are not limited and the underliquid shock pressure can be successively generated by repeated ignition in the ignition chamber.

④ According to the apparatus of the present invention, the requisite underliquid shock pressure can be easily and safely obtained and the apparatus can be widely applied to various industrial fields such as various processing fields and the like.

Example 2

An example of the apparatus for joining materials under pressure by using a LISPID will now be described below.

Figure 3:
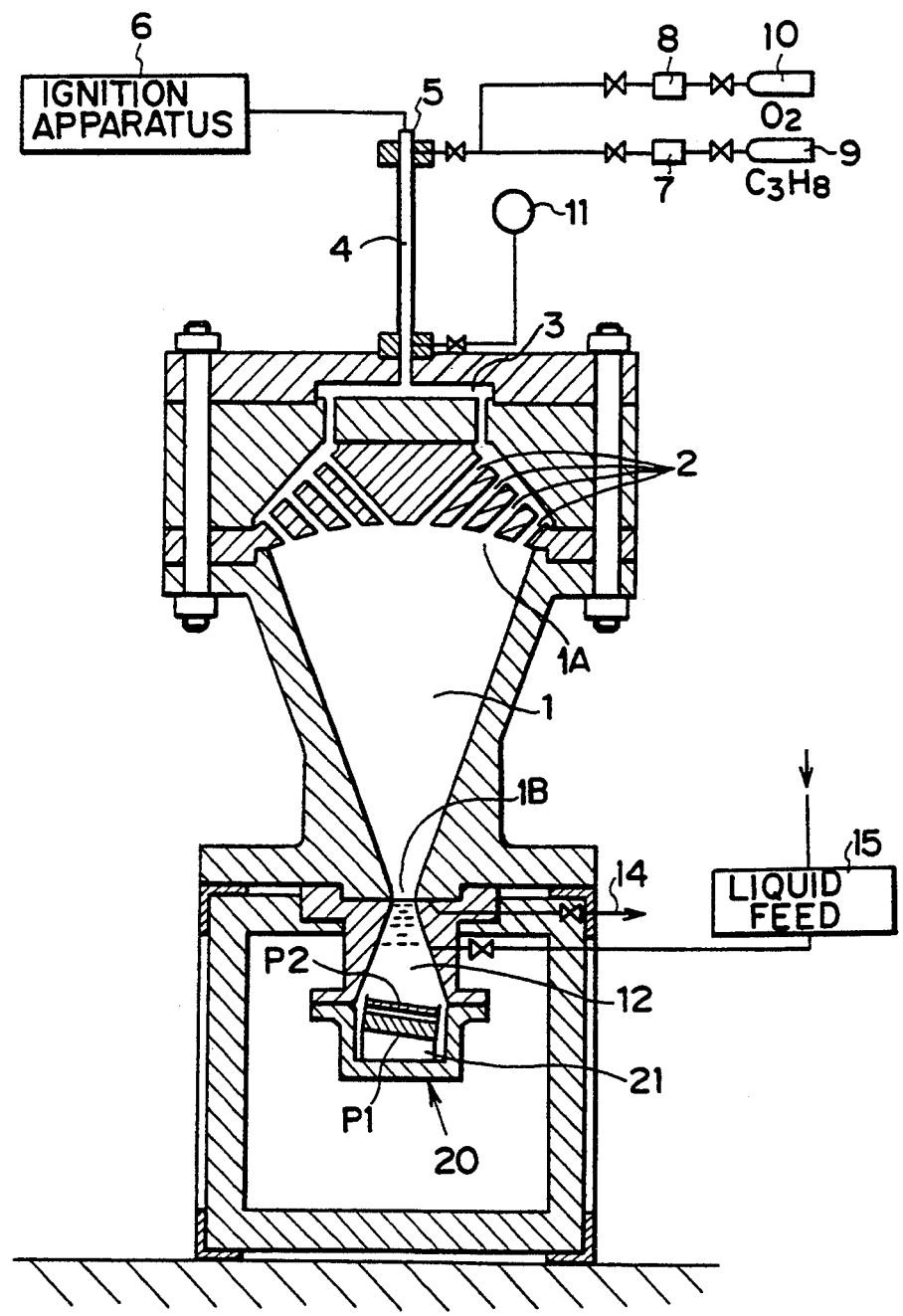
FIG. 3 is a vertical sectional view showing an example of an apparatus of the present invention for joining a material to be joined to a base material by means of an underliquid shock pressure induced by imploding detonation (hereinafter referred to as "LISPID")

In FIG. 3, the structure above the pressure medium chamber 12 is the same as that in FIG. 1 and the description of the structure is the same as that of the apparatus for generating a LISPID. Therefore, the description of the structure above a pressure joining chamber 20 is omitted. A film F, such as shown in FIG. 1A, may optionally be used.

The pressure joining chamber 20 wherein an underliquid shock pressure is used is arranged just under the pressure medium chamber 12. A holding apparatus 21 is positioned inside the pressure joining chamber 20. A base material P1 disposed at a predetermined spacing from a material P2 to be joined under pressure to the base material P1, are held on the holding apparatus 21. The base material P1 and the material P2 are inclined relative to the liquid surface in the pressure medium chamber 12.

The method for joining materials under pressure by using a LISPID will now be described below.

① Initially, a base material P1 and a material P2 to be joined together under pressure to the base material P1 are placed on the holding apparatus 21 in the pressure joining chamber 20 for joining under pressure.

② Subsequently, if necessary, the ignition chamber 4, the distribution chamber 3, the guidance paths 2 and the combustion chamber 1 are evacuated.

③ Then, the pressure medium chamber 12 is filled up with liquid such as water via liquid feed 15, and the ignition chamber 4, the distribution chamber 3, the guidance paths 2 and the combustion chamber 1 are filled up with combustible gas of a substantially stoichiometric mixture ratio from the fuel feed source 9 and the oxidizer feed source 10.

④ Thereafter, the spark plug 5 is caused to produce an ignition spark by the ignition apparatus 6. Detonation is generated by ignition inside the ignition chamber 4, and a flame is propagated to the upper end 1A of the combustion chamber 1 through the distribution chamber 3 and the guidance paths 2. Since the plurality of guidance paths 2 all have the same length, the flame passing through the plurality of guidance paths 2 substantially simultaneously reaches the upper end 1A of the combustion chamber 1.

⑤ A pressure wave with the flame advances from the upper end 1A to the lower end 1B in the combustion chamber 1. Since the cross-sectional area of the combustion chamber 1 gradually decreases downwardly, the pressure of the pressure wave is increased in the downward direction and becomes extremely high at the lower end 1B of the combustion chamber 1.

⑥ This high pressure is propagated from the upper liquid surface at the opening at the lower end 1B of the combustion chamber 1 into the liquid in chamber 12 and presses the material P2 to be joined to the base material P1 via a film or directly.

On this occasion, since the material P2 to be joined and the base material P1 are arranged inclined downwardly to the right, the material P2 to be joined begins to strike the base material from the left upper end and striking advances downwardly to the right. In this way, the material P2 to be joined and the base material P1 are wholly joined under pressure.

⑦ Thereafter, the materials P1 and P2 as a formed unitary product are taken out. The pressure joining of materials can be successively carried out by repeating the aforementioned steps ① to ⑥.

Figure 4:
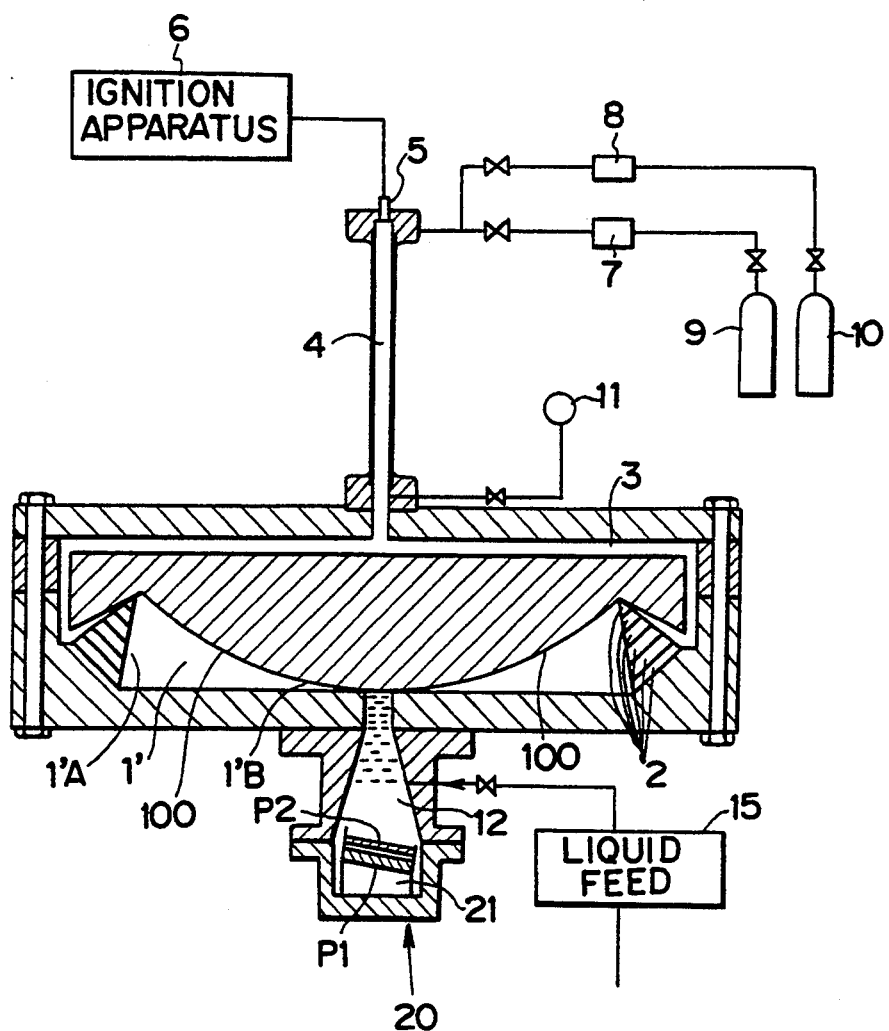
FIG. 4 is a vertical sectional view showing another example of the present invention of an apparatus for joining a material to be joined to a base material by means of a LISPID.

Another example of an apparatus for joining materials under pressure by using a LISPID will now be described with specific reference to FIG. 4. In FIG. 4, the description is omitted for elements having the same reference symbols as the corresponding elements of the apparatus of the example as shown in FIG. 1.

In the example of FIG. 4, the combustion chamber 1' is formed as a horizontal type, extending in the direction of the radius thereof. The combustion chamber 1' has an upper wall face formed at a portion of a spherical surface swelling downwardly (convex surface 100). The cross-sectional area of the combustion chamber 1' decreases toward the center of the combustion chamber 1'. The combustion chamber 1' communicates with the liquid-filled pressure medium chamber 12 at the center of the combustion chamber 1'. The apparatus of FIG. 4 is suitable for use where the height of the apparatus cannot be large.

The method for joining materials under pressure is substantially the same as that of the aforementioned example. The pressure wave produced by ignition by spark plug 5 accompanied by flame advances from the guidance paths 2 to the center 1'B as the other end, after reaching the side wall 1'A as one end of the combustion chamber 1'. Since the cross-sectional area of the combustion chamber 1' decreases toward the center 1'B, the pressure of the pressure wave becomes extremely high at the center 1'B. The high pressure is propagated to the liquid inside the pressure medium chamber 12 and presses the material P2 to be joined to the base material P1 in the pressure joining chamber 20 (as in the embodiment of FIG. 3), whereby the pressure joining of the materials P1, P2 is carried out.

According to the present invention, the following effect can be obtained:

Since the underliquid shock pressure can be set in accordance with the size of the material to be joined and the underliquid shock pressure can be easily successively generated, mass production of materials to be joined can be realized.

Example 3

An example of the apparatus for punching a plate by means of a LISPID will now be described below with reference to FIG. 5.

Figure 5:
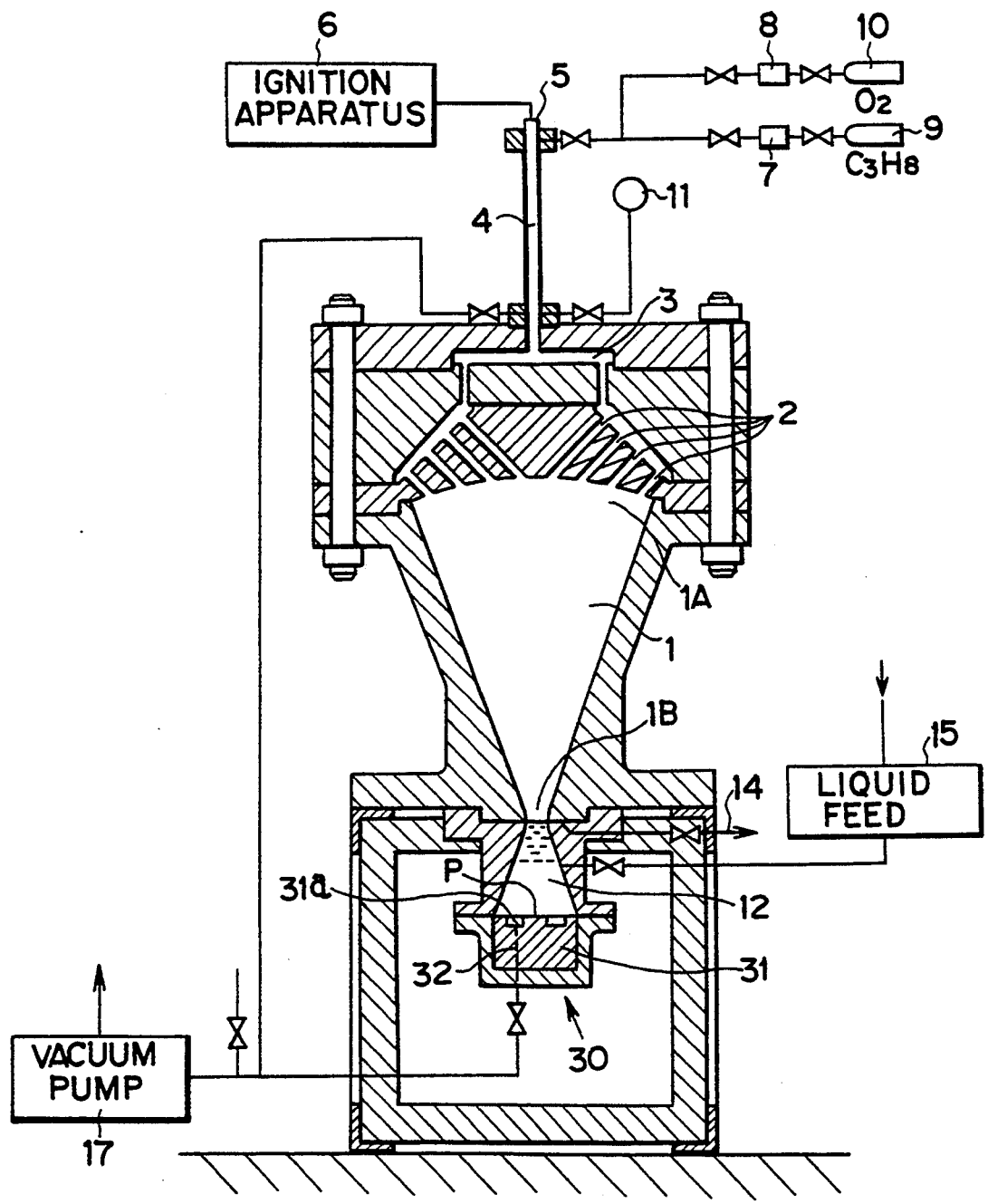
FIG. 5 is a vertical sectional view showing an example of an apparatus of the present invention for punching a plate by means of a LISPID.

In FIG. 5, since the structure above a punching chamber 30 is the same as that in FIGS. 1 and 1A, the description of the structure is the same as that of the apparatus for generating a LISPID, the description is omitted. A film F, as shown in FIG. 1A, may optionally be used.

The punching chamber 30 using a underliquid shock pressure is positioned just under the pressure medium chamber 12. Said punching chamber 30 contains a replaceable punching die 31 having blade edges of recess 31a for punching on the upper surface of the die 31. In the example as shown in FIG. 5, a plurality of blade edges of recess 31a are formed in the upper portion of the punching die. A plate P as a member to be punched is held, if necessary, by placing the peripheral portion of the plate P between a flange of the punching chamber 30 and a flange of the pressure medium chamber 12. Through holes 32 penetrating from the lower side to the upper side of the punching die are formed. Suction pipes from the vacuum pump apparatus 17 are connected to openings at the lower portion of the through holes 32. The space between the plate P and the upper side of the punching die 31 can be evacuated by means of the through holes 32.

The method for punching a plate by using the apparatus for punching a plate by means of a LISPID will now be described below.

① Initially, a plate P to be punched is placed on the punching die 31.

② Subsequently, if necessary, the ignition chamber 4, the distribution chamber 3, the guidance paths 2 and the combustion chamber 1 are evacuated by vacuum pump 17.

③ Then, the pressure medium chamber 12 is filled up with liquid such as water. The ignition chamber 4, the distribution chamber 3, the guidance paths 2 and the combustion chamber 1 are filled up with combustible gas of a substantially stoichiometric mixture ratio from the fuel feed source 9 and the oxidizer feed source 10.

④ Thereafter, the spark plug 5 is caused to produce an ignition spark by the ignition apparatus 6. Detonation is generated inside the ignition chamber 4. A flame is propagated to the upper end 1A of the combustion chamber 1 through the distribution chamber 3 and the guidance paths 2. Since the plurality of guidance paths 2 all have the same lengths, the flame passing through the plurality of guidance paths 2 reaches the upper end 1A of the combustion chamber 1 at the same time.

⑤ A pressure wave with the flame advances from the upper end 1A to the lower end 1B in the combustion chamber 1. Since the cross-sectional area of the combustion chamber 1 gradually decreases downwardly, the pressure of the pressure wave is increased and becomes extremely high at the lower end 1B of the combustion chamber 1.

⑥ This high pressure is propagated from the liquid surface at the opening at the lower end 1B of the combustion chamber 1, and the plate P strikes violently against the punching die 31 via a film or directly, whereby the punching processing of the plate is carried out by the blade of the punching die 31.

⑦ Thereafter, the plate P thus processed is taken out. The punching of the plate can be successively carried out by repeating the aforementioned steps ① to ⑥.

Figure 6:
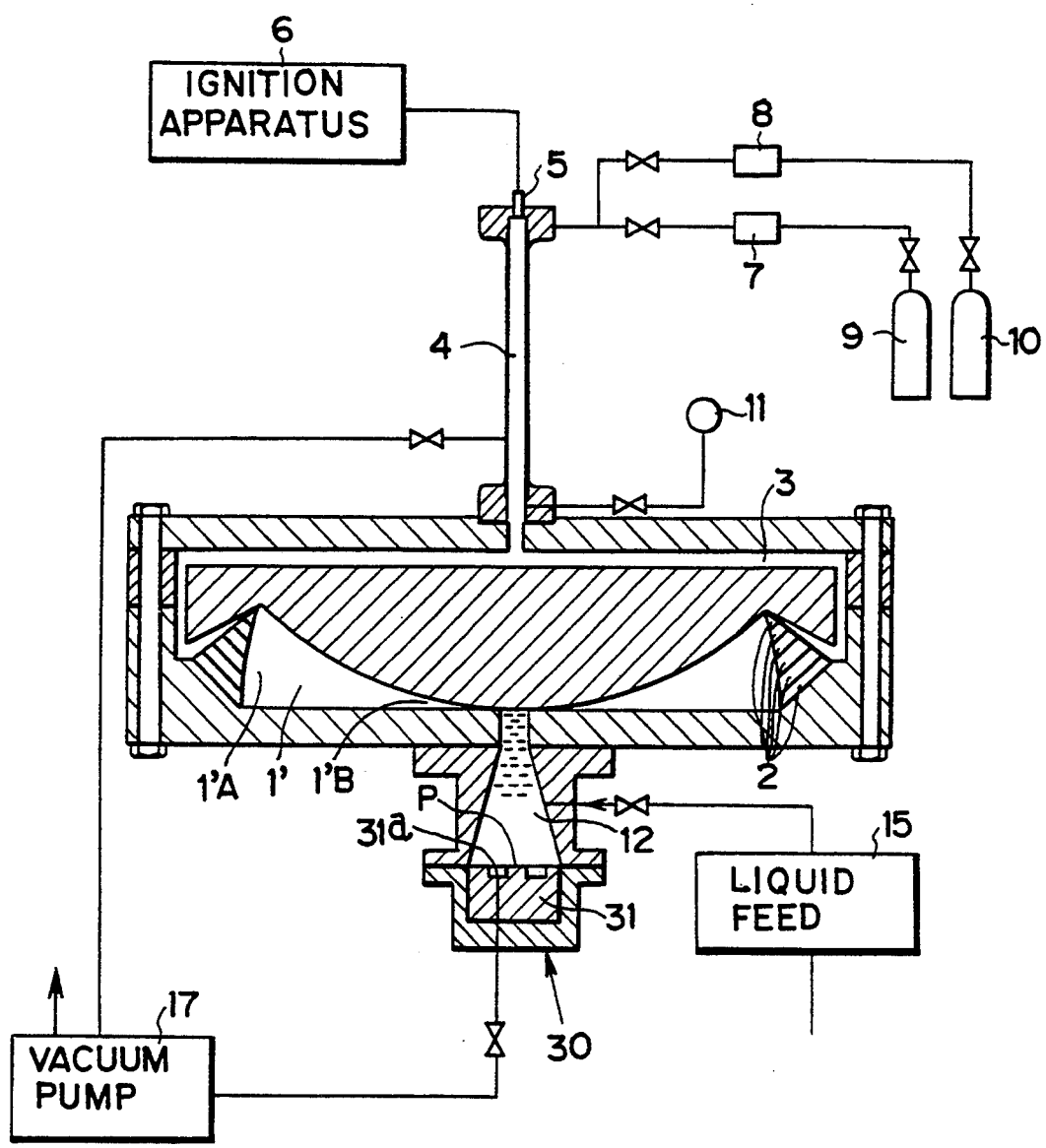
FIG. 6 is a vertical sectional view showing another example of an apparatus of the present invention for punching a plate by means of a LISPID.

Subsequently, another example of the apparatus for punching a plate by means of a LISPID will now be described with specific reference to FIG. 6. In FIG. 6, the structure above the punching chamber 30 is the same as that in FIG. 4. Therefore, the description of the structure is omitted.

The forming method in the example of FIG. 6 is the same as that in the aforementioned example. The pressure wave accompanied by flame advances from the guidance paths 2 to the center 1'B as the other end, after reaching the side wall 1'A as one end of the combustion chamber 1'. Since the cross-sectional area of the combustion chamber 1' decreases toward the center 1'B, the pressure of the pressure wave becomes extremely high at the center 1'B. The high pressure is propagated to the liquid inside the pressure medium chamber 12 and presses the plate P to the punching die 31 in the punching chamber 30, whereby the punching of the plate is carried out by means of blade edges of recess 31a of the punching die 31.

According to the present invention, the following effect can be produced:

Since the underliquid shock pressure can be easily set in accordance with the size of a member to be processed by punching and the under liquid shock pressure can be successively generated, safe mass production of punched products becomes possible.

Example 4

An example of another apparatus for forming a material by means of a LISPID pressure will now be described below with reference to FIG. 7. Since the structure of the apparatus of FIG. 7 for forming a material by means of a LISPID and the method for forming a material by using this apparatus are described in Example 1 with specific reference to FIG. 1, the description of the structure and the method is omitted.

Figure 7:
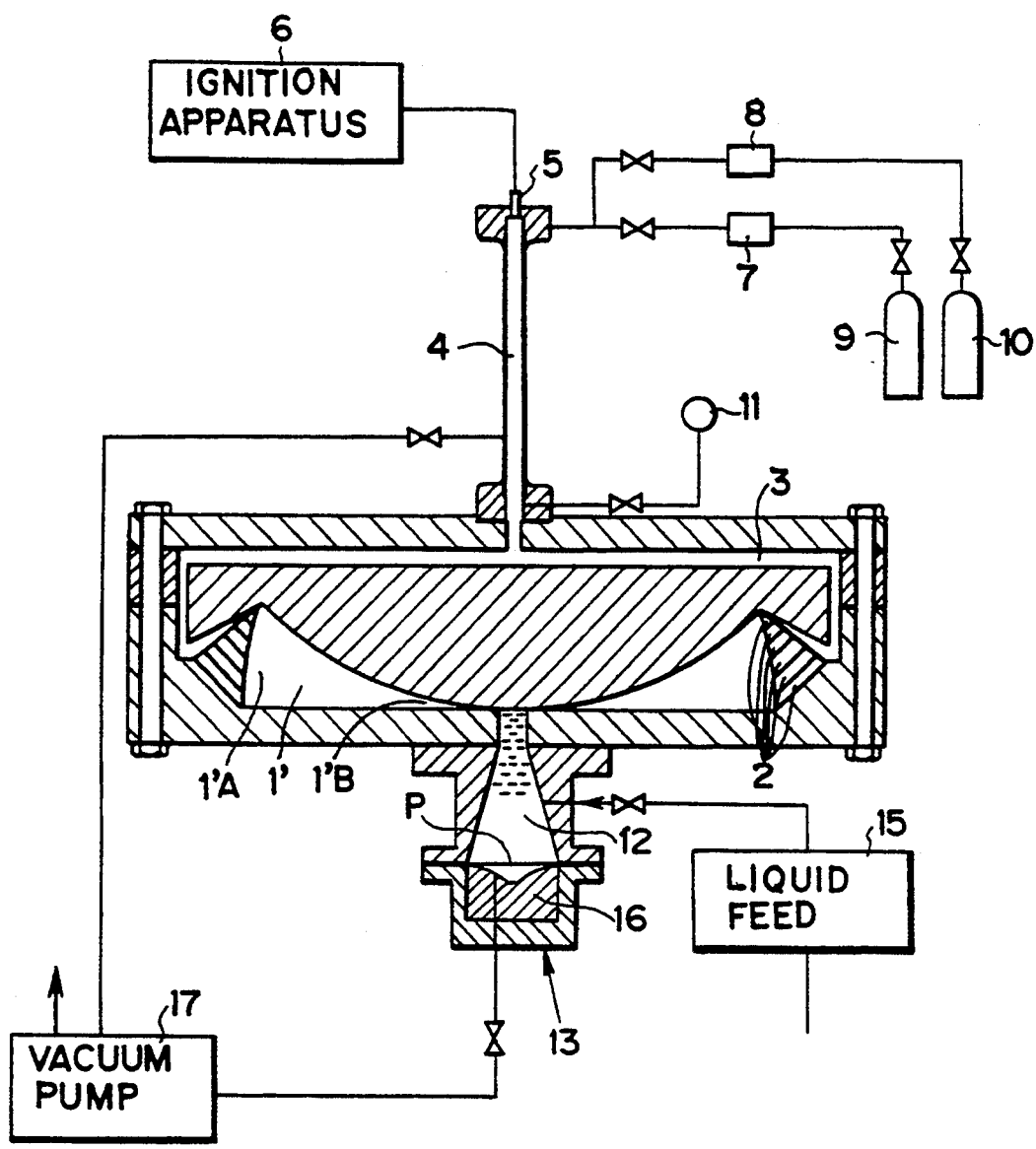
FIG. 7 is a vertical sectional view showing another example of an apparatus of the present invention for forming a plate by means of a LISPID.

In FIG. 7, the structure above the pressure medium chamber 12 is the same as that in FIG. 4. Therefore, the description of the structure is omitted.

The forming method is the same as that in the aforementioned example. The pressure wave accompanied by flame advances from the guidance paths 2 to the center 1'B as the other end, after reaching the side wall 1'A as one end of the combustion chamber 1'. Since the cross-sectional area of the combustion chamber 1' decreases toward the center 1'B, the pressure of the pressure wave becomes extremely high at the center 1'B. The high pressure is propagated to the liquid inside the pressure medium chamber 12 and presses the plate P to the forming die 16 in the forming chamber 13, whereby the plate P is formed to the surface contour of the upper surface of die 16.

According to the present invention, the following effect can be produced:

Since the underliquid shock pressure can be easily set in accordance with the size of a member to be formed and the underliquid shock pressure can be successively generated, safe, mass production of formed products becomes possible.

Example 5

An example of an apparatus for processing food by means of a LISPID will now be described below with reference to FIG. 8.

Figure 8:
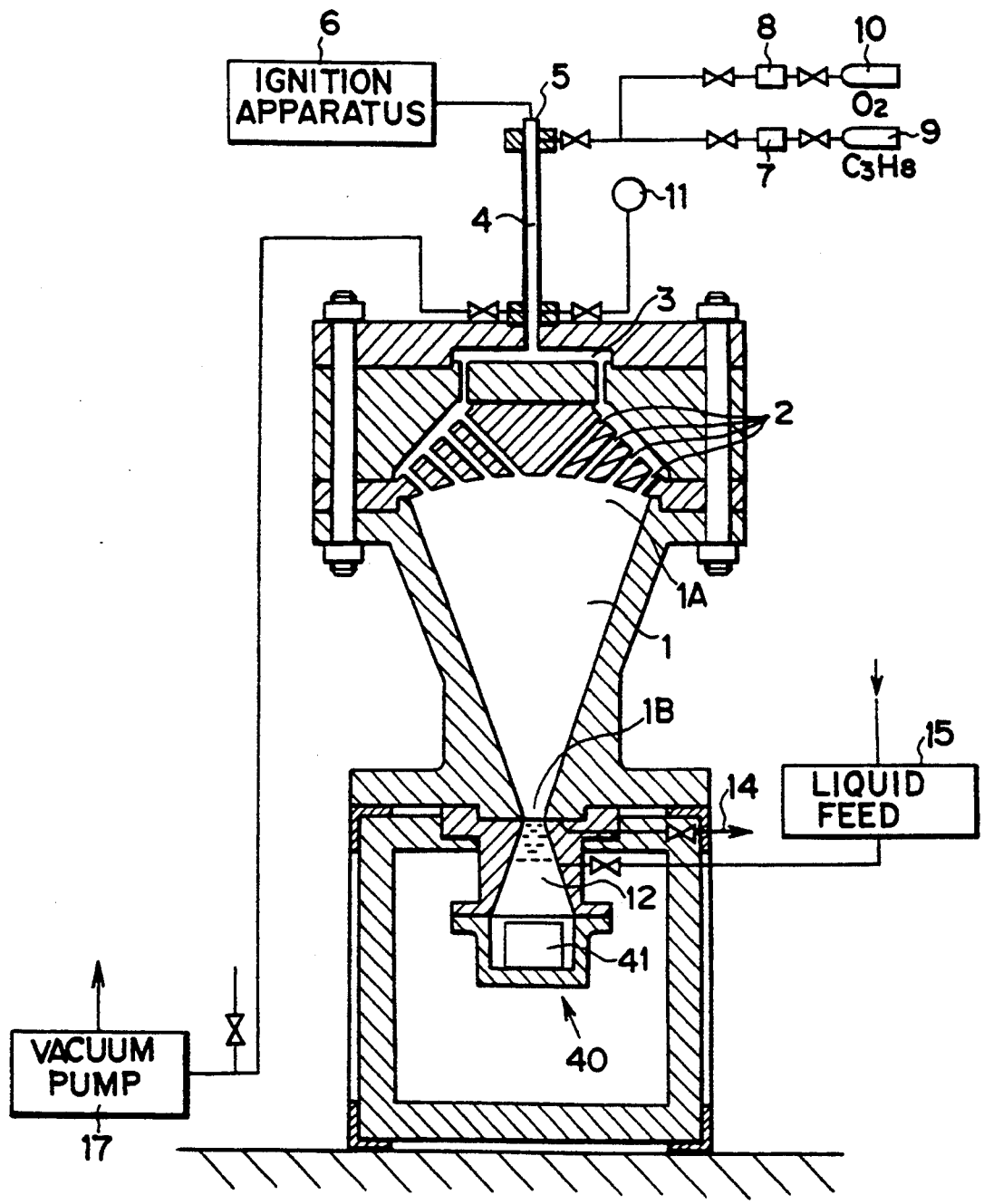
FIG. 8 is a vertical sectional view showing an example of an apparatus of the present invention for processing food by means of a LISPID.

Since the structure of FIG. 8 above a food processing chamber 40 is the same as that in FIGS. 1 and 1A, the description of the structure is the same as that of the apparatus for generating a LISPID, the description of the structure is omitted.

A food processing chamber 40, using a shock pressure, is positioned just under the pressure medium chamber 12. The food processing chamber 40 contains food 41 which is to be processed, being pressurized via a film or directly. The food 41 may be, for example, meat or food containing a great amount of moisture.

A method for processing food by using the apparatus of FIG. 8 for processing food by means of a LISPID will now be described below.

① Initially, food 41 to be processed is placed inside the food processing chamber 40.

② Subsequently, if necessary, the ignition chamber 4, the distribution chamber 3, the guidance paths 2 and the combustion chamber 1 are evacuated.

③ Then, the pressure medium chamber 12 is filled up with liquid such as water. The ignition chamber 4, the distribution chamber 3, the guidance paths 2 and the combustion chamber 1 are filled up with combustible gas of a substantially stoichiometric mixture ratio from the fuel feed source 9 and the oxidizer feed source 10.

④ Thereafter, the spark plug 5 is caused to produce an ignition spark work by the ignition apparatus 6. A detonation is generated inside the ignition chamber 4. Flame is propagated to the upper end 1A of the combustion chamber 1 through the distribution chamber 3 and the guidance paths 2. Since the plurality of guidance paths 2 have the same length, the flame passing through the plurality of guidance paths 2 reaches the upper end 1A of the combustion chamber at the same time.

⑤ A pressure wave with the flame advances from the upper end 1A to the lower end 1B in the combustion chamber 1. Since the cross-sectional area of the combustion chamber 1 gradually decreases downwardly, a pressure of the pressure wave is increased in the downward direction and becomes extremely high at the lower end 1B of the combustion chamber 1.

⑥ This high pressure is propagated from the liquid surface at the opening at the lower end 1B of the combustion chamber 1 into the liquid 12 and an underliquid shock pressure applied to the food 41 contained in the food processing chamber 40 directly or via a film over the food, whereby the food 41 is softened or sterilized.

⑦ Thereafter, the food 41 is taken out. The food processing can be successively carried out by repeating the aforementioned steps ① to ⑥.

Another example of an apparatus for processing food by means of a LISPID will now be described with specific reference to FIG. 9.

Figure 9:
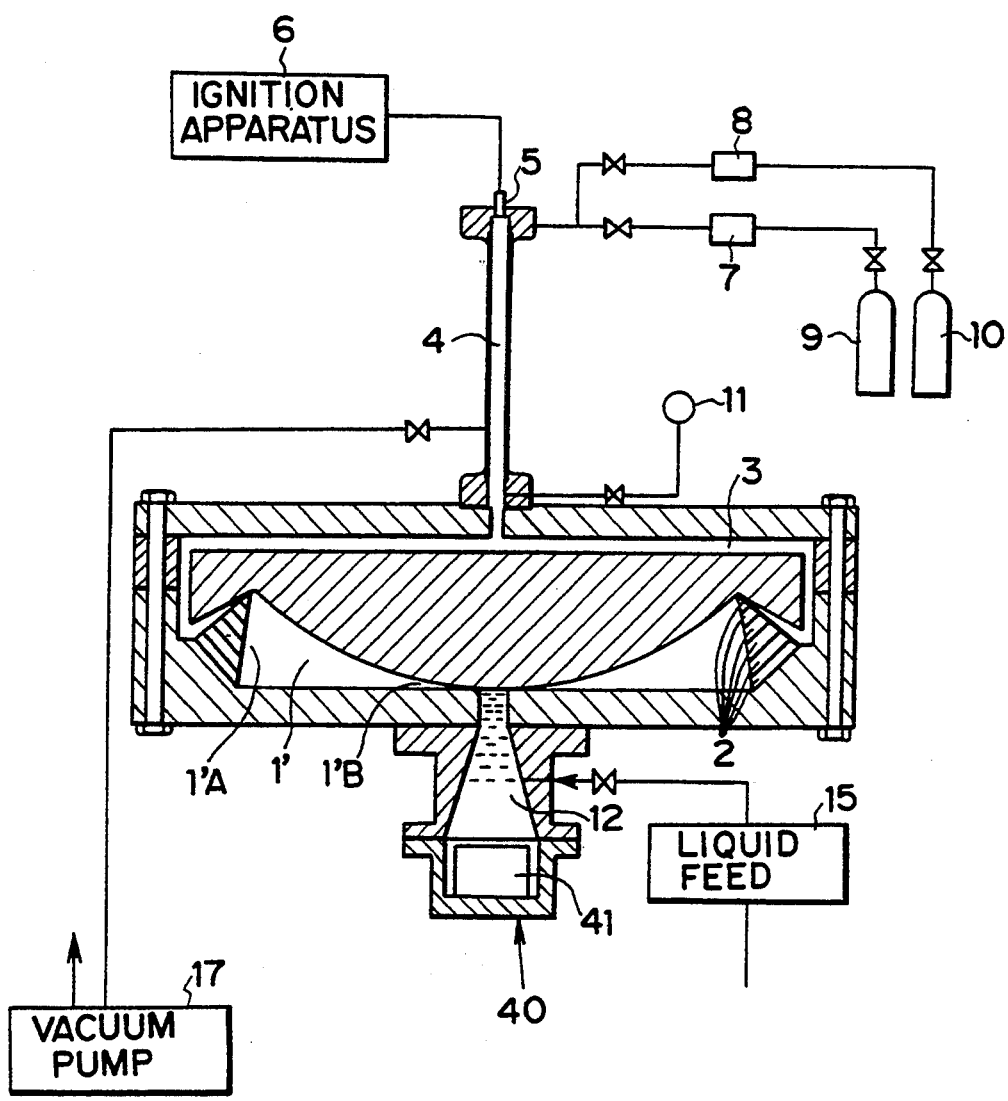
FIG. 9 is a vertical sectional view showing another example of an apparatus of the present invention for processing food by means of a LISPID.

In FIG. 9, the structure above the food processing chamber 40 is the same as that in FIG. 4. Therefore, the description of the structure is omitted.

The method for processing food using the apparatus of FIG. 9 is the same as that in the aforementioned example. The pressure waves accompanied by flame advances from the guidance paths 2 to the center 1'B as the other end, after reaching the side wall 1'A as one end of the combustion chamber 1'. Since the cross-sectional area of the combustion chamber 1' decreases toward the center 1'B, the pressure of the pressure wave becomes extremely high at the center 1'B. The high pressure is propagated to the liquid inside the pressure medium chamber 12 and an underliquid shock pressure is applied to the food 41 ( directly or via film $F_1$ as shown in FIG. 1A) contained in the food processing chamber 40, whereby the food is softened or sterilized. When the food is sterilized in liquid, the food 41 is wrapped by a film having the same material as that of film $F_1$ to prevent the liquid from permeating into the food 41.

According to the present invention, the following effect can be produced:

① Since the underliquid shock pressure can be easily set in accordance with the size or amount of food to be processed and the underliquid shock pressure can be successively generated, safe mass production of processed food becomes possible.

② Food can be softened and sterilized without changing a taste of the food.

Example 6

The apparatus for forming a plate by using the apparatus for generating an underelastomer shock pressure induced by imploding detonation ( ELSPID ) will now be described below with reference to FIG. 10.

Figure 10:
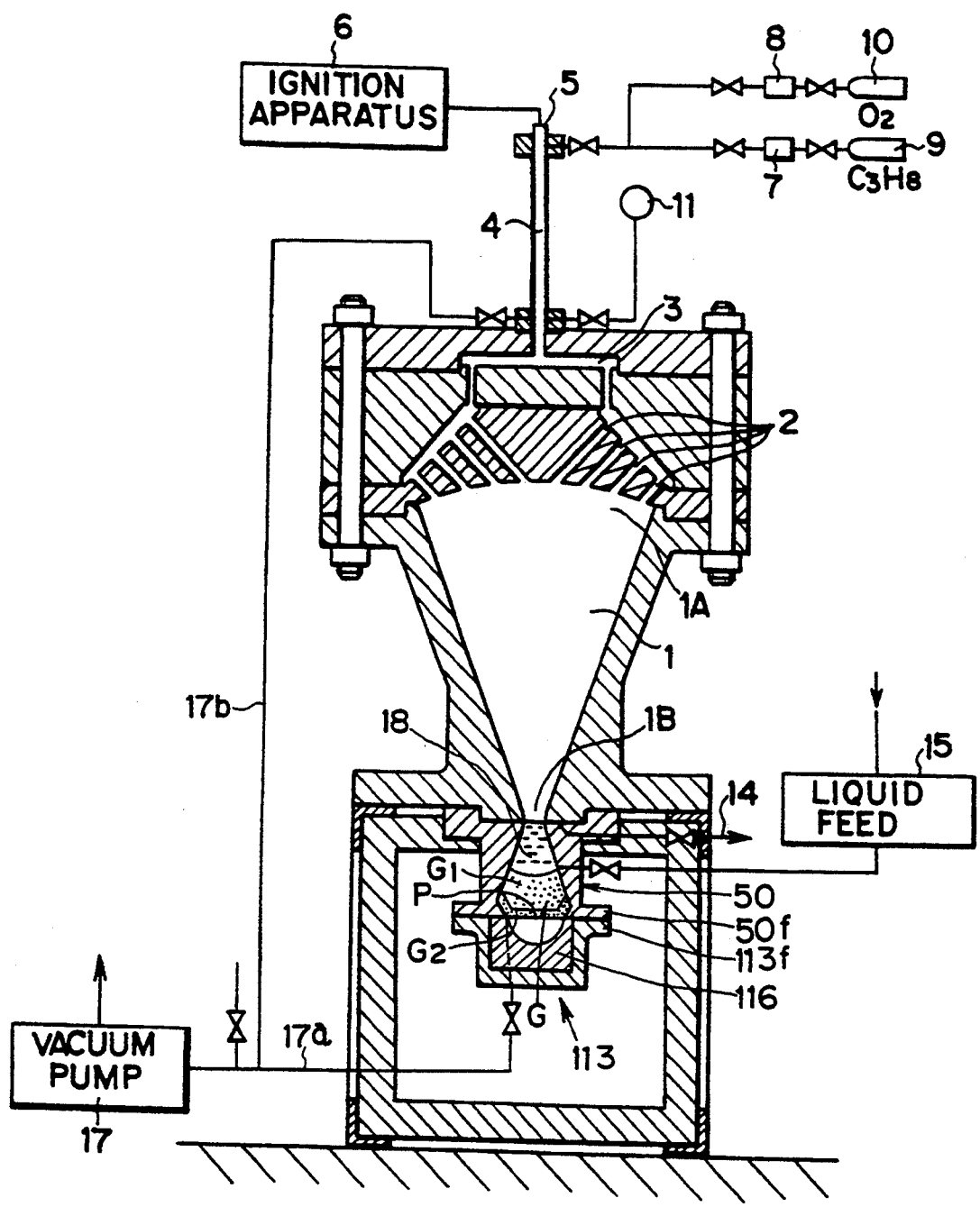
FIG. 10 is a vertical sectional view showing an example of an apparatus of the present invention for forming a plate by means of an underelastomer shock pressure induced by imploding detonation (hereinafter referred to as "ELSPID")

In FIG. 10, reference numeral 1 denotes a combustion chamber whose cross-sectional area is largest at the upper end 1A of thereof and smallest at the lower end 1B thereof. Thus, the combustion chamber forms a conical portion imploding downwardly. An upper inner wall of the upper end 1A of the combustion chamber 1 is upwardly gradually curved. A plurality of hole-shaped guidance paths 2 communicate with the inner wall of the upper end 1A. The guidance paths 2 are connected to the distribution chamber 3 having a disc-shaped space at the upper portion of the combustion chamber 1. The plurality of guidance paths 2 have the same length. The ignition chamber 4 extending upwardly communicates with the distribution chamber 3. The spark plug 5 is caused to produce a spark by the ignition apparatus 6 and is positioned above the ignition chamber 4. The fuel feed source 9 is connected to the upper portion of the ignition chamber 4 via the flowmeter 7, and the oxidizer feed source is connected to the upper portion of the ignition chamber 4 via the flowmeter 8. A pressure gauge 11 is provided for confirming a pressure inside the ignition chamber 4.

Figure 10A:
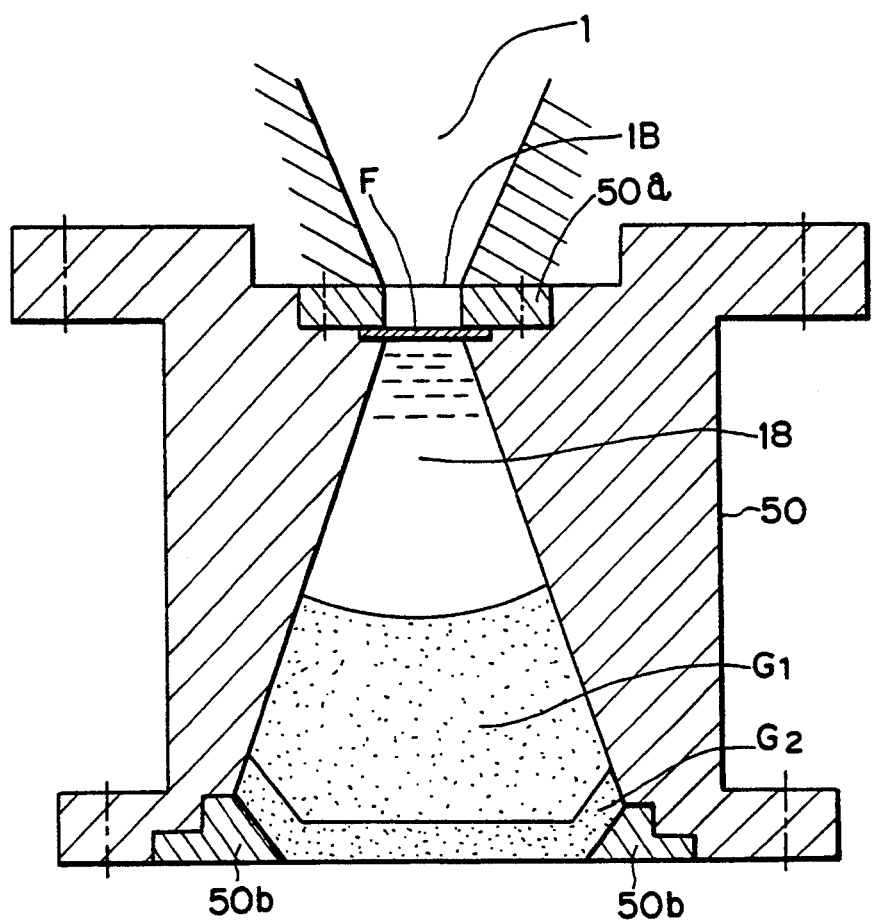
FIG. 10A shows a state that a film is attached to the pressure medium chamber.

The lower end 1B of the combustion chamber 1 has an opening. A pressure medium chamber 50 is connected to the lower end 1B of the combustion chamber 1. To prevent a high-temperature and high-pressure gas from directly contacting an elastic rubber or rubber-like body G, a liquid 18 such as water is contained in a space above elastic rubber body G inside the pressure medium chamber 50. The elastic rubber-like body G is charged under an intermediate portion of the pressure medium chamber 50. When the elastic rubber-like body G is charged, the fitting bracket is taken apart. The elastic rubber-like body G is composed of an upper elastic rubber-like body $G_1$ and a lower elastic rubber-like body $G_2$. Since the lower elastic rubber-like body $G_2$ contacts a processed product, deteriorates and is worn, the lower elastic rubber-like body $G_2$ is replaceably mounted in the lower portion of the elastic body pressure chamber 50. Vinyl resin, teflon resin and urethane resin other than natural rubber and synthetic rubber are used for the elastic rubber-like body G. An interface between the upper liquid surface of the liquid 18 and the lower end 1B of the combustion chamber 1 can be a liquid surface or can be formed by putting a strong film which is easy to be deformed on the upper liquid surface. A strong film F is attached to a position as shown in FIG. 10A by means of a mounting plate 50a. Natural rubber or synthetic rubber is used for the film F. The thickness of the film F is determined depending on the size of a processed product. When the processed product has a size of 1 m or less, for example, the thickness of the film F is from 5 to 10 mm. When the product has a size of from 1 to 2 m, the thickness of the product is from 10 to 20 mm. An air vent pipe 14 is connected to the pressure medium chamber 50 via a valve. A liquid feed apparatus 15 is connected to the pressure medium chamber 50 via a valve. The body G may be rubber or other suitable elastomeric rubber-like material. Hereinafter the body G is referred to as a rubber body for ease of description.

A forming chamber 113 is positioned at the lower end of the pressure medium chamber 50. A three-dimensional forming die 116 is contained in the forming chamber 113. The forming die 116 is replaceably placed in the forming chamber 113 to change formed products. A plate P to be formed is held, for example, by the peripheral portion of the plate P being put between a flange of the forming chamber 113 and a flange of the pressure medium chamber 50. The vacuum pump apparatus 17 for evacuating a space between the forming die 116 and the plate P is connected to the forming chamber 113 by means of pipes 17a. The vacuum pump apparatus 17 is also connected to the ignition chamber 4 via pipes 17b.

The method for forming a plate P by using the apparatus of FIG. 10 will now be described below.

① A plate P to be formed is placed on a forming die 116.

② Subsequently, the ignition chamber 4, the distribution chamber 3, the guidance paths 2 and the combustion chamber 1 are evacuated. At the same time, the space between the forming die 116 and the plate P is evacuated.

③ Then, the upper portion of the pressure medium chamber 50 is filled up with liquid 18. The ignition chamber 4, the distribution chamber 3, the guidance paths 2 and the combustion chamber 1 are filled up with a combustible gas of a substantially stoichiometric mixture ratio from the fuel feed source 9 and the oxidizer feed source 10.

④ Thereafter, the spark plug 5 is caused to produce an ignition spark by the ignition apparatus 6. Detonation is generated inside the ignition chamber 4. Flame is propagated to the upper end 1A of the combustion chamber 1 through the distribution chamber 3 and the guidance paths 2. Since the plurality of guidance paths 2 have the same length, the flame passing through the plurality of guidance paths 2 reaches the upper end 1A of the combustion chamber at substantially the same time.

⑤ A pressure wave with the flame advances from the upper end 1A to the lower end 1B in the combustion chamber 1. Since the cross-sectional area of the combustion chamber 1 gradually decreases downwardly, a pressure of the pressure wave is increased in the downward direction and becomes extremely high at the lower end 1B of the combustion chamber 1.

⑥ Since the upper liquid surface of liquid 18 is present at the opening of the lower end 1B of the combustion chamber this high pressure is propagated from the liquid surface of the opening at the lower end 1B of the combustion chamber 1 into the liquid 18. Further, the high pressure is propagated into the elastic rubber body G. Then, kinetic energy is applied to the plate P via a film or directly and the plate P strikes the forming die 16 whereby the plate is formed to the contour of the upper die surface of die 116. The kinetic energy is a shock pressure generated by the pressure wave propagated in the elastic rubber body G and is referred to as an underelastomer shock pressure.

⑦ Thereafter, the plate P as a product is taken out. The forming of a plate P can be successively carried out by repeating the aforementioned Steps of ① to ⑥.

Figure 16A:
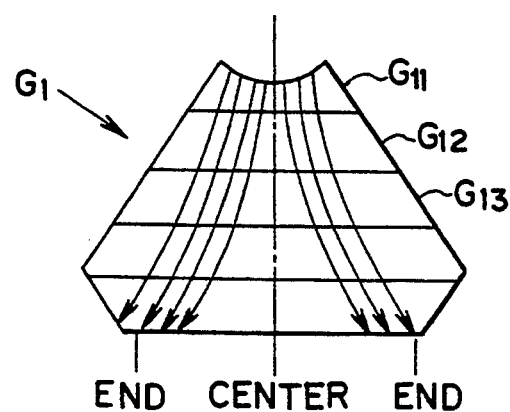
FIG. 16A shows a propagating direction of pressure waves propagating in an elastic body G composed of a plurality of layers.
Figure 16B:
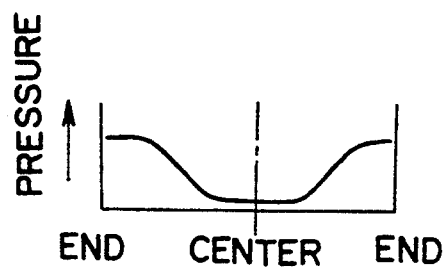
FIG. 16B shows a distribution of pressures of pressure waves applied to a processed material via an elastic body formed in a plurality of layers.
Figure 16C:
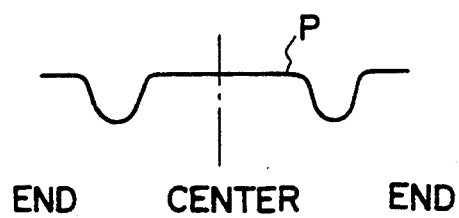
FIG. 16C shows a processed product, both ends of which are subjected to a great forming.

The elastic rubber-like body (or the elastic body) $G_1$ should have a plurality of layers as shown in FIG. 16A. For example, the shore hardness of a first layer $G_{11}$ is 20°. The shore hardness is increased by stages from the first layer $G_{11}$ toward the lower layers. The shore hardness of the sixth layer is 80°. If the shore hardness of the sixth layer $G_{16}$ is 80°, the shock impedance is increased by stages toward the lower layers. The pressure waves are propagated toward the lateral ends of each of the layers in the elastic body $G_1$ constructed in such a way, being refracted by stages. As a result, the values of propagated pressures are high at the lateral ends as shown in FIG. 16B and low at the center of each of the layers. Such distribution of the pressures is effective for processing a formed product P having parts, for the ends of which a great amount of processing is required as shown in FIG. 16C. When a formed product, for the center of which a great amount of processing is required, is processed, the distribution of hardnesses can be reversed relative to the above-mentioned elastic body $G_1$. The shock impedance X is represented with the formula: $X = C \times \rho$, where the sound velocity of the elastic body G: C; the density of the elastic body: $\rho$. When an elastic body $G_1$ is formed by injecting natural rubber or synthetic rubber into a mold and solidifying it and the cooling speed of the mold is varied continuously from the upper portion of the mold toward the lower portion of the mold, then the elastic body $G_1$ whose hardness is varied continuously from the upper portion of the elastic body toward the lower portion of the elastic body. The pressure waves W are propagated in the elastic body $G_1$ by stages or continuously toward the lateral ends of each of the layers and can be used for the above-mentioned purpose.

Figure 17A:
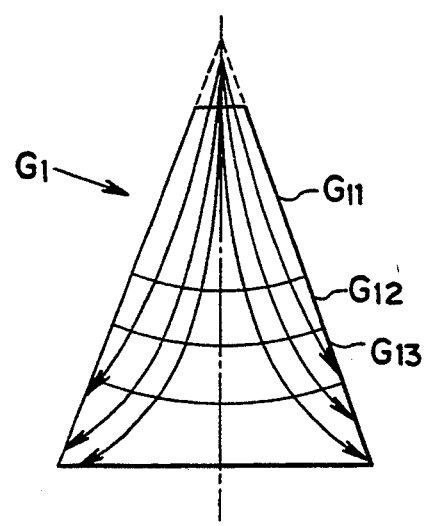
FIG. 17A shows that a propagating direction of pressure waves propagating in an elastic body having a conical shape.
Figure 17B:
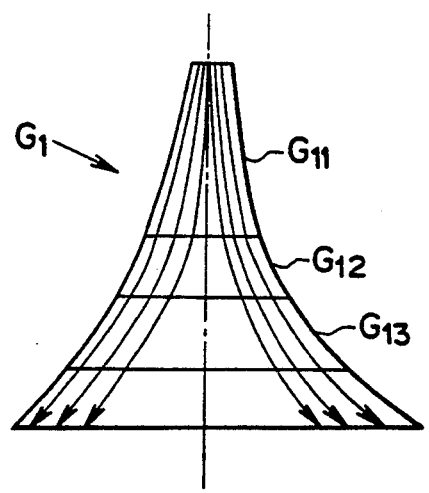
FIG. 17B shows that a propagating direction of pressure waves propagating in an elastic body having a shape of an horn.

FIG. 17A shows a propagating direction of pressure waves propagating in an elastic body having a conical shape and FIG. 17B shows a propagating direction of pressure waves propagating in an elastic body having a shape of an horn. In the case shown in FIG. 17A, reduction of a shock pressure is produced.

As a measure for softening the reduction of the shock pressure, it can be taken to have a shape of the wall of the pressure medium chamber curved so as to meet a curve which the shock pressure forms.

The pressure waves can be propagated toward the lateral, ends of each of the layers, being refracted by stages, by constituting liquid 18, with which the pressure medium chamber 50 is filled, with a layer of light oil, a layer of fuel oil and a layer of water from the upper side of the layers to the lower side of the layers. When a liquid wherein a suspension obtained by suspending clay in water stands still for a predetermined period of time is used, the pressure waves W can be propagated toward the lateral ends of each of the layers, being continuously refracted. When the liquid 18 is constituted in this way, the liquid 18 can be used as the aforementioned elastic body G. The aforementioned elastic body G and liquid 18 which can refract the propagating direction of the pressure waves are referred to as a medium.

The forming chamber 113 and the pressure medium chamber 50 can be separated from each other by disconnecting the flange 113$f$ from the flange 51$f$. Since the elastic body is mounted inside the pressure medium chamber 50 after the forming chamber has been separated from the pressure medium chamber 50, the combustion chamber 1 and the pressure medium pressure chamber 50 can be operated (vacuum operation, change of liquid and the like) together with the operation of attaching and detaching of the forming chamber 113.

When hydrogen or gaseous hydrocarbons are used as a fuel gas, water is produced as a combustion product. The water can be used as a liquid for the pressure medium pressure chamber 50.

Still another example of an apparatus for forming a plate by utilizing the apparatus for generating a ELSPID will now be described below with reference to FIG. 11.

Figure 11:
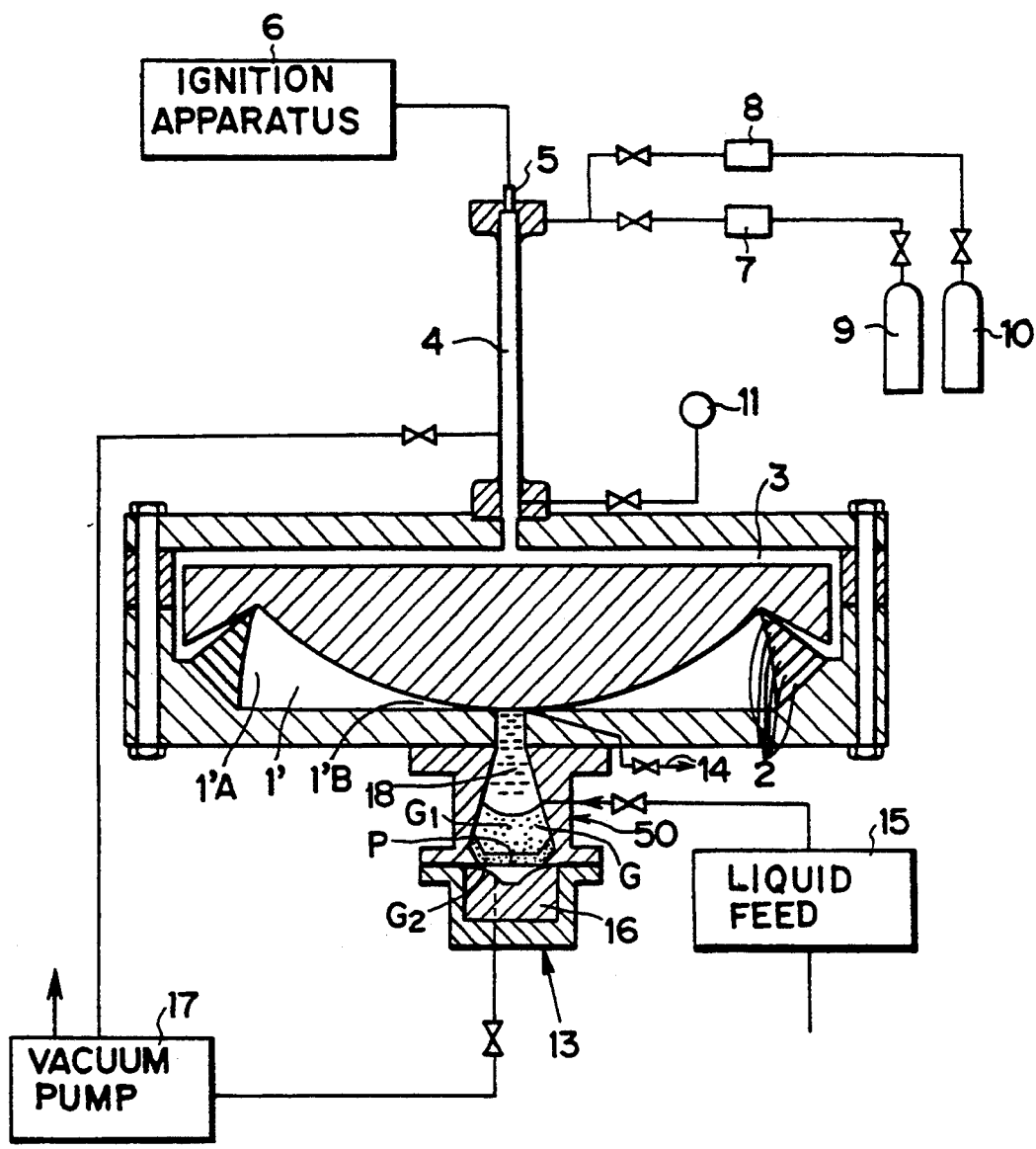
FIG. 11 is a vertical sectional view showing another example of an apparatus of the present invention for forming a plate by means of an ELSPID.

In FIG. 11, the description of the apparatus is omitted for elements having the same reference symbols as the portions common to those of the apparatus in the aforementioned example as shown in FIG. 10.

In this example of FIG. 11, the combustion chamber 1' is formed as a horizontal type combustion chamber extending in a radial direction. The combustion chamber 1' has an upper wall face formed in a part of a substantial spherical surface swelling downwardly (i.e., downward convex). The cross-sectional area of the combustion chamber 1' decreases toward the center of the combustion chamber 1'. The combustion chamber 1' communicates with the pressure medium chamber 50 at the center of the combustion chamber 1'. The apparatus of this example is appropriate for use where the height of the apparatus cannot be great.

The forming method is the same as that in the aforementioned example. The pressure waves accompanied by flame advance from the guidance paths 2 to the center 1'B as the other end, after reaching the side wall 1'A as one end of the combustion chamber 1'. Since the cross-sectional area of the combustion chamber 1' decreases toward the center 1'B, the pressure of the pressure wave becomes extremely high at the center 1'B.

The high pressure is propagated to the liquid 18 inside the pressure medium chamber 50 and presses the plate P to the forming die 16 in the forming chamber 13 whereby the plate P is formed to the contour of the upper surface of forming die 16.

According to the present invention, the following effect can be produced.

① An underelastomer shock pressure having good characteristics and a steep or sharp start can be easily obtained at a low cost.

② Since the level of the underelastomer shock pressure in the apparatus of the present invention depends on the pressure of the initial charging gas in the detonation apparatus, the apparatus of the present invention has a good controllability.

③ Since explosives as in conventional apparatuses wherein bullets are shot and explosives are exploded are not used, places where the apparatus of the present invention may be installed are not limited, and the underelastomer shock pressure can be successively generated.

④ Since an underelastomer shock pressure in accordance with the size of a member to be formed can be easily set and an underelastomer shock pressure can be successively generated, mass production of formed products becomes possible.

Example 7

The apparatus for punching a plate by using the apparatus for generating an ELSPID will now be described below with reference to FIG. 12.

Figure 12:
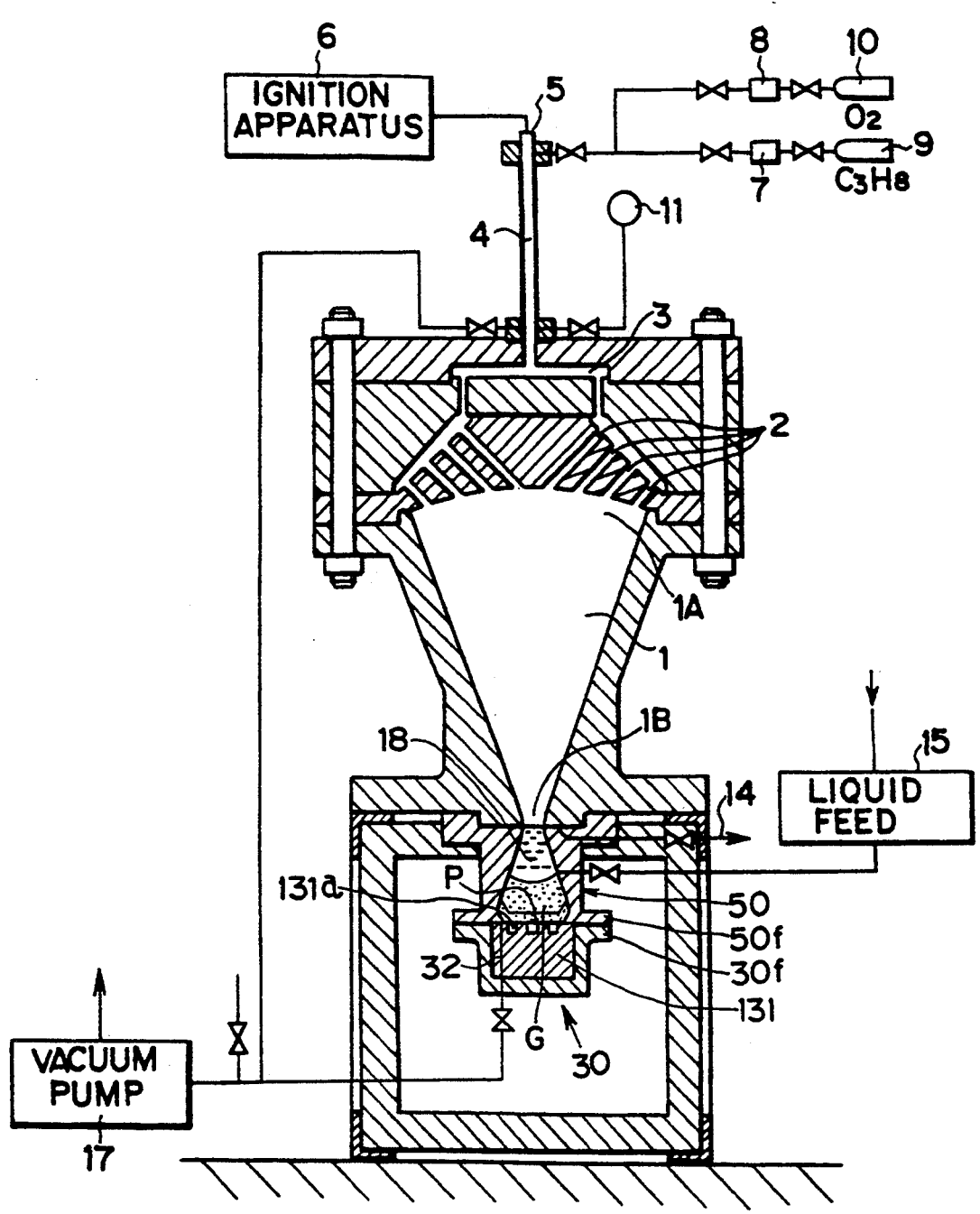
FIG. 12 is a vertical sectional view showing an example of an apparatus of the present invention for punching a plate by means of an ELSPID.

In FIG. 12, the structure above the pressure medium chamber 50 is the same as that as shown in FIG. 10. The description of the structure is the same as that of the apparatus for forming a plate by using the apparatus for generating an ELSPID. Therefore, the description of these structures is omitted.

A punching chamber 30 is positioned at the lower end of the pressure medium chamber 50. A punching die 131 having a blade for punching on the upper side thereof is replaceably contained in the punching chamber 30. In the example as shown in FIG. 12, a plurality of blade edges of recess 131a are formed in the upper portion of the punching die. A plate P as a member to be punched is held by the peripheral portion of the plate P being put between a flange of the punching chamber 30 and a flange of the pressure medium chamber 50. A through hole 32 passing through the punching die 131 from the lower side to the upper side thereof is formed. A suction pipe is connected to an opening of the lower side of the through hole which in turn is connected to vacuum pump 17. The space between the plate P and the upper side of the punching die 131 can be evacuated by the through hole 32.

The method for punching a plate by using the apparatus of FIG. 12 for generating an ELSPID will now be described below.

① Initially, a plate P to be punched is placed on a punching die 131.

② Subsequently, the ignition chamber 4, the distribution chamber 3, the guidance paths 2 and the combustion chamber 1 are evacuated. At the same time, the space between the punching die 131 and the plate P is evacuated.

③ Then, the upper portion of the pressure medium chamber is filled up with liquid 18. The ignition chamber 4, the distribution chamber 3, the guidance paths 2 and the combustion chamber 1 are filled up with combustible gas of a substantially stoichiometric mixture ratio from the fuel feed source 9 and the oxidizer feed source 10.

④ Thereafter, the spark plug 5 is caused to produce an ignition spark by the ignition apparatus 6. Detonation is generated inside the ignition chamber 4. A flame is propagated to the upper end 1A of the combustion chamber 1 through the distribution chamber 3 and the guidance paths 2. Since the plurality of guidance paths 2 have the same length, the flame passing through the plurality of guidance paths 2 reaches the upper end 1A of the combustion chamber at substantially the same time.

⑤ A pressure wave with the flame advances from the upper end 1A to the lower end 1B in the combustion chamber 1. Since the cross-sectional area of the combustion chamber 1 gradually decreases downwardly, a pressure of the pressure wave is increased in the downward direction and becomes extremely high at the lower end 1B of the combustion chamber 1.

⑥ Since the upper liquid surface inside the pressure medium chamber 50 is present in the opening at the lower end 1B of the combustion chamber 1, this high pressure is propagated from the liquid surface into the liquid 18 and further into the elastic rubber-like body G. The underelastomer shock pressure is applied to the plate P via a film or directly. The film F is attached to a position as shown in FIG. 10A by means of a mounting plate 50a. Natural rubber or synthetic rubber is used for the film F. The plate P strikes the punching die 131 in the punching chamber 30 whereby the punching is carried out.

⑦ Thereafter, the plate P thus processed is taken out. The punching of the plate can be successively carried out by repeating the aforementioned steps ① to ⑥.

As described about the elastic body G, in the Example 6, the distribution of the pressure waves W propagating in accordance with the shape of the processed product can be varied by changing the hardness or the density of medium (elastic body $G_1$ and liquid 18) continuously or by stages. Thus, it becomes possible to process a product effectively and with high accuracy.

The punching chamber 131 and the pressure medium chamber 50 can be separated from each other by disconnecting the flange 50f from the flange 51f. Since the elastic body G is left mounted inside the pressure medium chamber 50, the combustion chamber 1 and the pressure medium chamber 50 can be operated (vacuum operation, change of liquid and the like) together with the operation of attaching and detaching of the forming chamber 13.

Another example of an apparatus for punching a plate by using the apparatus for generating an ELSPID will now be described below with reference to FIG. 13.

Figure 13:
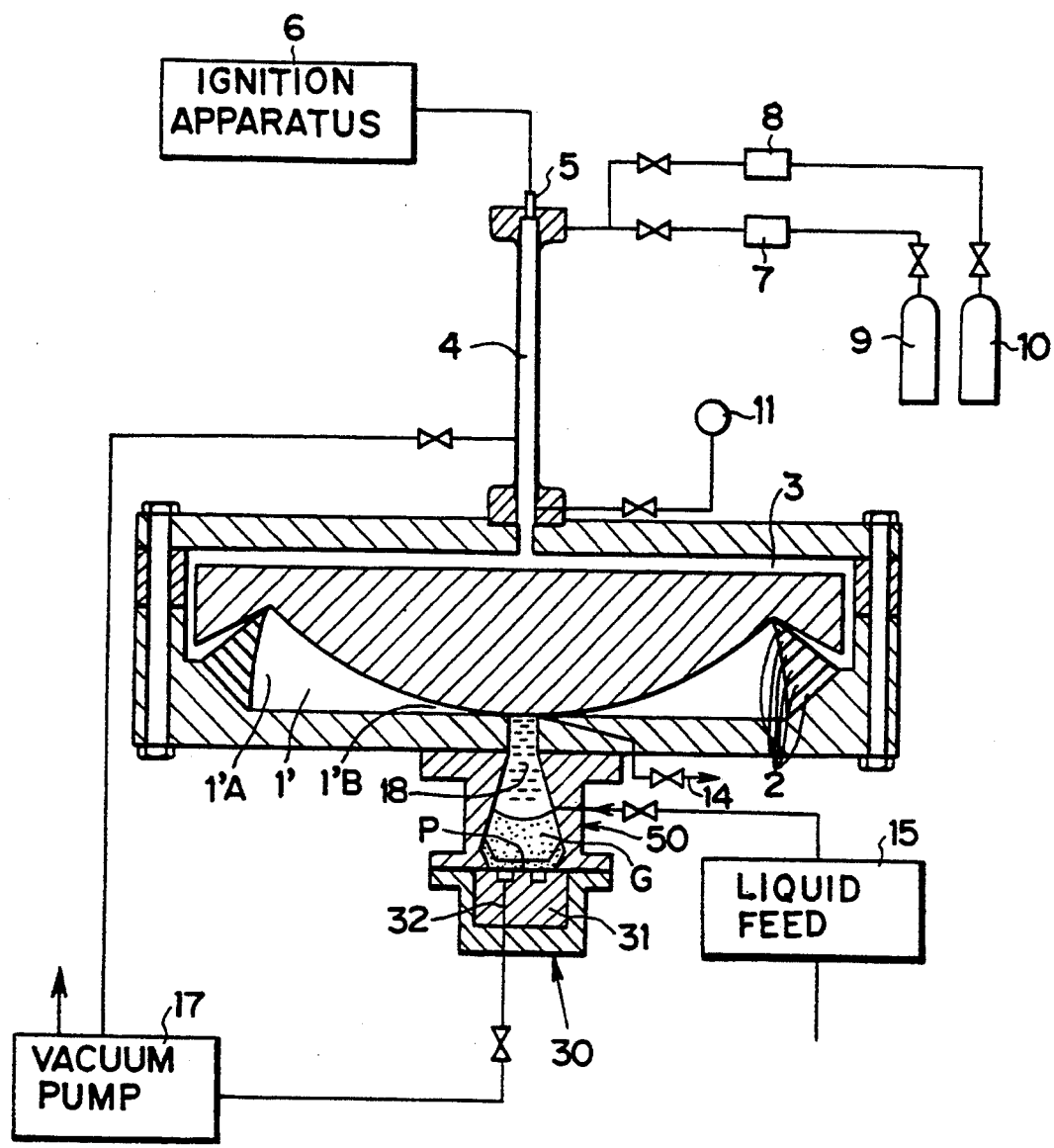
FIG. 13 is a vertical sectional view showing another example of an apparatus of the present invention for punching a plate by means of an ELSPID.

In FIG. 13, the structure above the punching chamber 30 is the same as that in FIG. 11. Therefore, the description of the structure is omitted.

The punching method is the same as that in the aforementioned example. The pressure waves accompanied by flame advance from the guidance paths 2 to the center 1'B as the other end, after reaching the side wall 1'A as one end of the combustion chamber 1'. Since the cross-sectional area of the combustion chamber 1' decreases toward the center 1'B, the pressure of the pressure wave becomes extremely high at the center 1'B. The high pressure is propagated to the liquid 18 inside the pressure medium chamber 50 and presses the plate P to the punching die 31 in the punching chamber 30, whereby the punching of the plate is carried out.

According to the present invention, the following effect can be produced:

Since the underelastomer shock pressure can be easily set in accordance with the size of a member to be processed by punching and the underelastomer shock pressure can be successively generated, mass production of punched products becomes possible.

Example 8

The apparatus for restriking a plate by using the apparatus for generating an ELSPID will now be described below with reference to FIG. 14.

Figure 14:
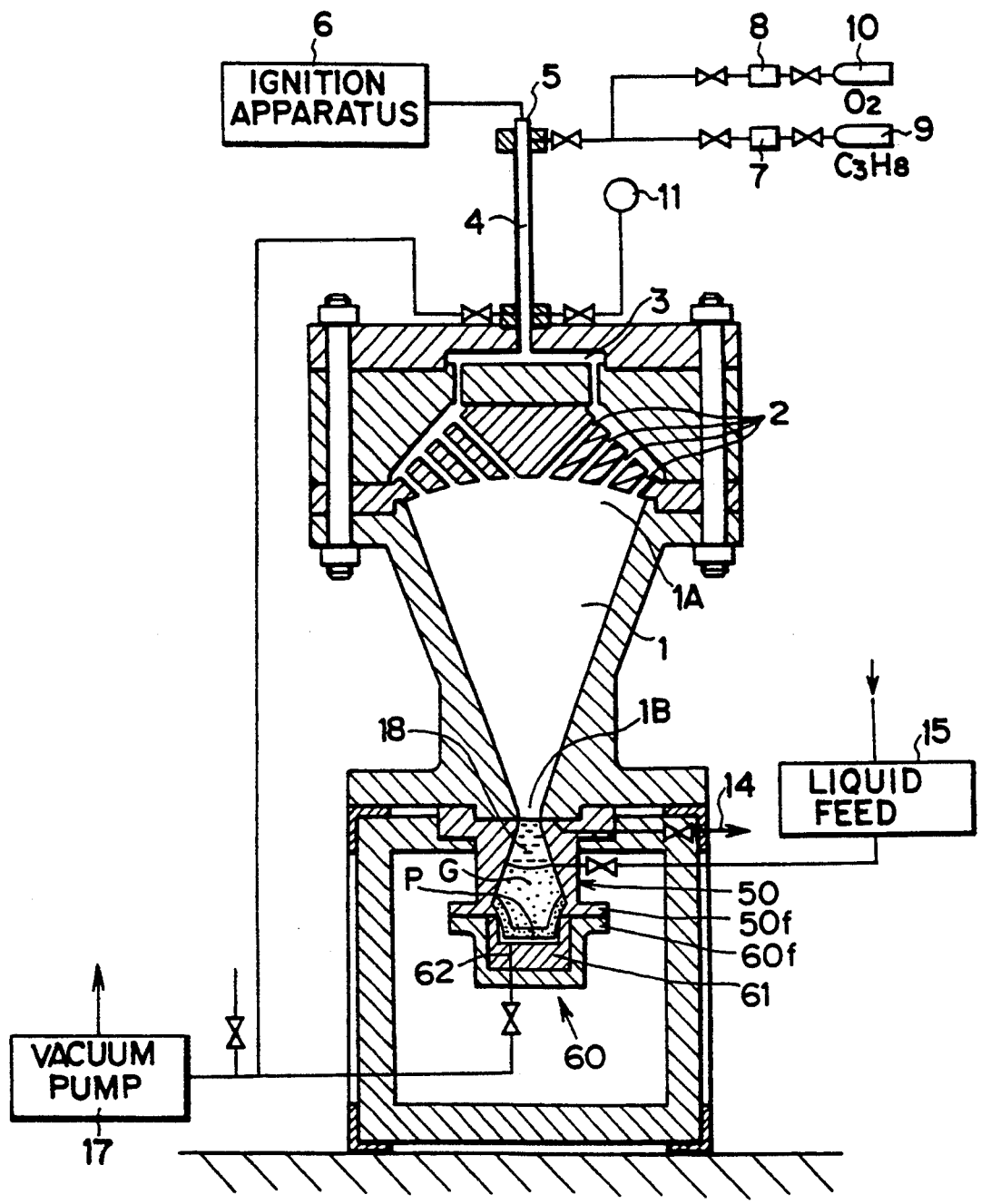
FIG. 14 is a vertical sectional view showing an example of an apparatus of the present invention for restriking a plate by means of an ELSPID.

In FIG. 14, the structure above a restriking chamber 60 is the same as that in FIG. 10. Therefore, the description of the structure is omitted.

The restriking chamber 60 is positioned just under the pressure medium chamber 50. The restriking chamber 60 contains replaceably a restriking die 61. A plate P to be restruck is held, if necessary, by the peripheral portion of the plate P being put between a flange of the pressure medium chamber 50 and a flange of the restriking chamber 60. A through hole 62 passing through the restriking die 61 from the lower side to the upper side thereof is formed. A suction pipe from the vacuum pump apparatus 17 is connected to an opening of the lower side of the through hole 62. The space between the plate P and the upper side of the restriking die 61 can be evacuated by the through hole 62.

The method for restriking a plate by using the apparatus of FIG. 14 for generating an ELSPID will now be described below.

① Initially, a plate P to be restruck is placed on a restriking die 61.

② Subsequently, the ignition chamber 4, the distribution chamber 3, the guidance paths 2 and the combustion chamber 1 are evacuated. At the same time, the space between the restriking die 61 and the plate P is evacuated.

③ Then, the upper portion of the pressure medium chamber 50 is filled up with liquid 18. The ignition chamber 4, the distribution chamber 3, the guidance paths 2 and the combustion chamber 1 are filled up with combustible gas of a substantially stoichiometric mixture ratio from the fuel feed source 9 and the oxidizer feed source 10.

④ Thereafter, the spark plug 5 is caused to produce an ignition spark by the ignition apparatus 6. Detonation is generated inside the ignition chamber 4. The flame is propagated to the upper end 1A of the combustion chamber 1 through the distribution chamber 3 and the guidance paths 2. Since the plurality of guidance paths 2 have the same length, the flame passing through the plurality of guidance paths 2 reaches the upper end 1A of the combustion chamber at substantially the same time.

⑤ A pressure wave with the flame advances from the upper end 1A to the lower end 1B in the combustion chamber 1. Since the cross-sectional area of the combustion chamber 1 gradually decreases downwardly, a pressure of the pressure wave is increased in the downward direction and becomes extremely high at the lower end 1B of the combustion chamber 1.

⑥ Since the liquid surface inside the pressure medium chamber 50 is present in the opening at the lower end 1B of the combustion chamber 1, this high pressure is propagated from the liquid surface into the liquid 18 and further into the elastic rubber body G. The underelastomer shock pressure is applied to the plate P via a film or directly. The film F is attached to a position as shown in FIG. 10A by means of a mounting plate 50a. Natural rubber or synthetic rubber is used for the film F. The plate P strikes the restriking die 61 in the restriking chamber 60 whereby the restriking of the plate is carried out.

⑦ Thereafter, the plate P as a formed product is taken out. The restriking of the plate can be successively carried out by repeating the aforementioned steps ① to ⑥.

As described about the elastic body $G_1$ in the Example 6, the distribution of pressure waves W propagating in accordance with the shape of a processed product can be varied by changing the hardness or the density of medium (elastic body $G_1$ and liquid 18) by stages or continuously. Thus, it becomes possible to process a product effectively and with high accuracy.

The restriking chamber 60 and the pressure medium chamber 50 are separated from each other by disconnecting the flange 60f from the flange 50f. Since the elastic body G is left mounted inside the pressure medium chamber 50 after the restriking chamber 60 and the pressure medium chamber 50 are separated from each other, the combustion chamber 1 and the pressure medium pressure chamber 50 can be operated (vacuum operation, change of liquid and the like) together with the operation of attaching and detaching of the restriking chamber 60.

Another example of the apparatus for restriking a plate by using the apparatus for generating an ELSPID will now be described below with reference to FIG. 15.

Figure 15:
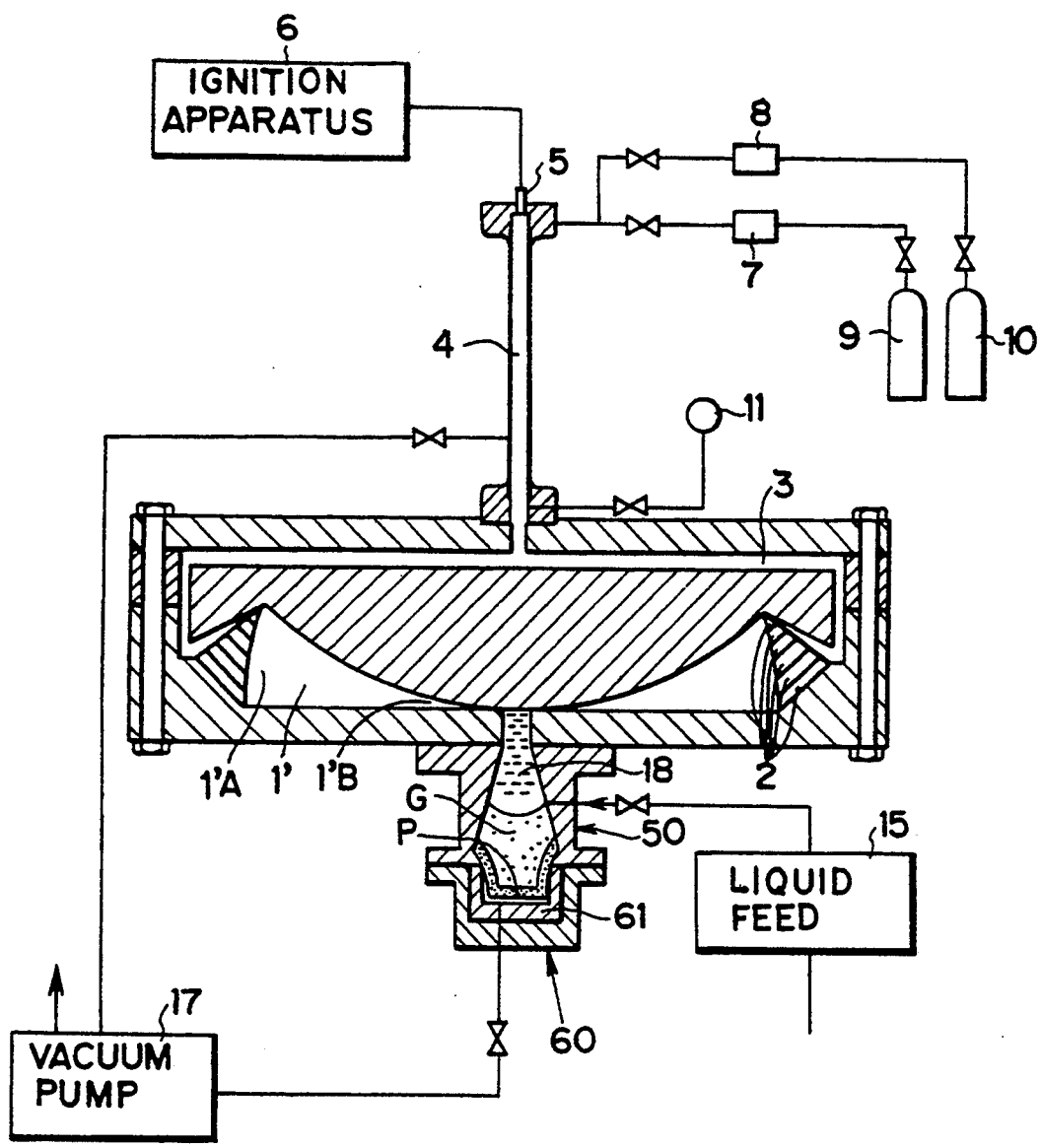
FIG. 15 is a vertical sectional view showing another example of an apparatus of the present invention for restriking a plate by means of an ELSPID.

In FIG. 15, the structure above the restriking chamber 60 is the same as that in FIG. 10. Therefore, the description of the structure is omitted.

The restriking method is the same as that in the aforementioned example. The pressure wave accompanied by flame advances from the guidance paths 2 to the center 1'B as the other end, after reaching the side wall 1'A as one end of the combustion chamber 1'. Since the cross-sectional area of the combustion chamber 1' decreases toward the center 1'B, the pressure of the pressure wave becomes extremely high at the center 1'B. The high pressure is propagated to the liquid 18 inside the pressure medium chamber 50 and presses the plate P to the restriking die 61 in the restriking chamber 60, whereby the restriking of the plate is carried out.

According to the present invention, the following effect can be produced:

Since the underelastomer shock pressure can be easily set in accordance with the size of a member to be restruck and the underelastomer shock pressure can be successively generated, mass production of restruck products becomes possible. A film F, such as shown in FIG. 1 and described hereinabove, may optionally be used in any or all of the above-described embodiments.

The present invention has been described above with respect to particular methods and particular apparatus. It should be clear that various modifications and alterations can be made thereto, within the scope of the appended claims. Also, various features from the different embodiments can be combined in any operable combination, consistent with the present disclosure, within the scope of the invention as defined in the appended claims.

What is claimed is:

1. An apparatus for generating an underliquid shock pressure, comprising:
   a combustion chamber whose cross-sectional area decreases from one end of the chamber toward another end of the chamber:
   an ignition chamber, to which fuel is fed and in which a spark producing means is positioned;
   a plurality of guidance paths extending from said ignition chamber and communicating with said one end of said combustion chamber, each of the guidance paths having substantially the same length; and
   a pressure medium chamber connected to an opening at said another end of said combustion chamber having the smallest cross-sectional area.

2. The apparatus of claim 1, which further comprises:
   a pressure joining chamber communicating with said pressure medium chamber;
   a holding apparatus for holding a material to be pressurized by the hydraulic pressure via a film; and
   a base material being contained in said pressure joining chamber.

3. The apparatus of claim 1, which further comprises:
   a pressure joining chamber communicating with said pressure medium chamber;
   a holding apparatus for holding a material to be pressurized directly by the underliquid shock pressure; and
   a base material being contained in said pressure joining chamber.

4. The apparatus of claim 1, which further comprises:
   a punching chamber communicating with said pressure medium chamber; and
   a punching die, adapted to hold a member to be processed and which is pressurized by the underliquid shock pressure via a film, being contained in said punching chamber.

5. The apparatus of claim 1, which further comprises:
   a punching chamber communicating with said pressure medium chamber; and
   a punching die, adapted to hold a member to be processed and which is pressurized directly by the underliquid shock pressure, being contained in said punching chamber.

6. The apparatus of claim 1, which further comprises:
   a forming chamber communicating with said pressure medium chamber; and a forming die, adapted to hold a member to be formed and which is pressurized by the underliquid shock pressure via a film, being contained in said forming chamber.

7. The apparatus of claim 1, which further comprises:
   a forming chamber communicating with said pressure medium chamber; and
   a forming die, adapted to hold a member to be formed and which is pressurized directly by the underliquid shock pressure, being contained in said forming chamber.

8. The apparatus of claim 1, which further comprises a food processing chamber communicating with said pressure medium chamber, and adapted to contain food to be pressurized by said underliquid shock pressure via a film.

9. The apparatus of claim 1, which further comprises a food processing chamber communicating with said pressure medium chamber, and adapted to contain food to be pressurized directly by said underliquid shock pressure.

* * * * *